Feb. 20, 1962 B. HOWARD 3,022,376
DISPLAY TRANSMITTER
Filed Sept. 28, 1959 14 Sheets-Sheet 6

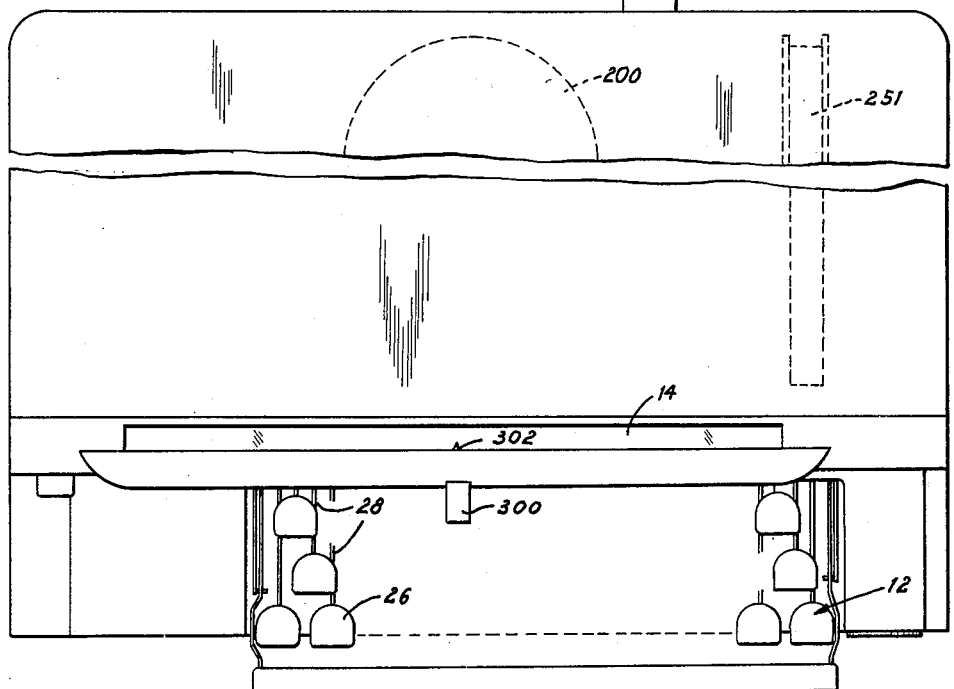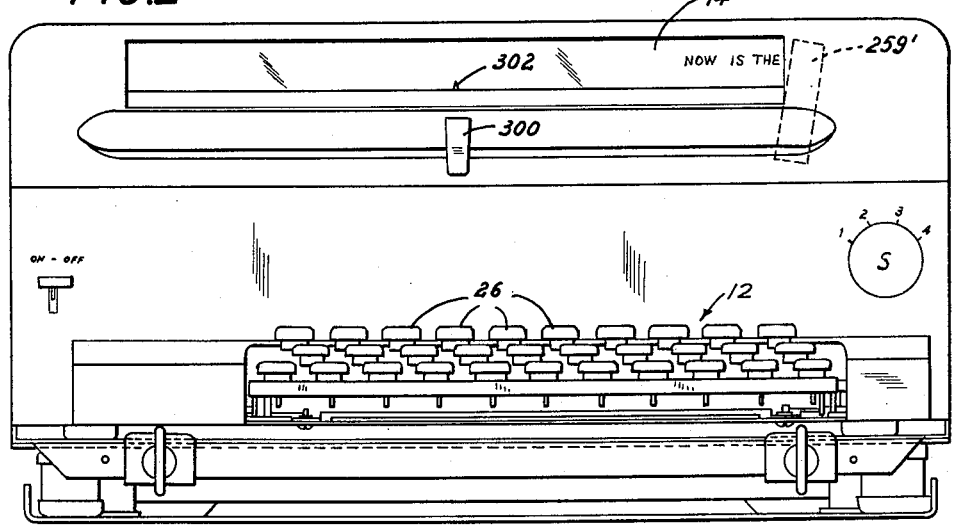

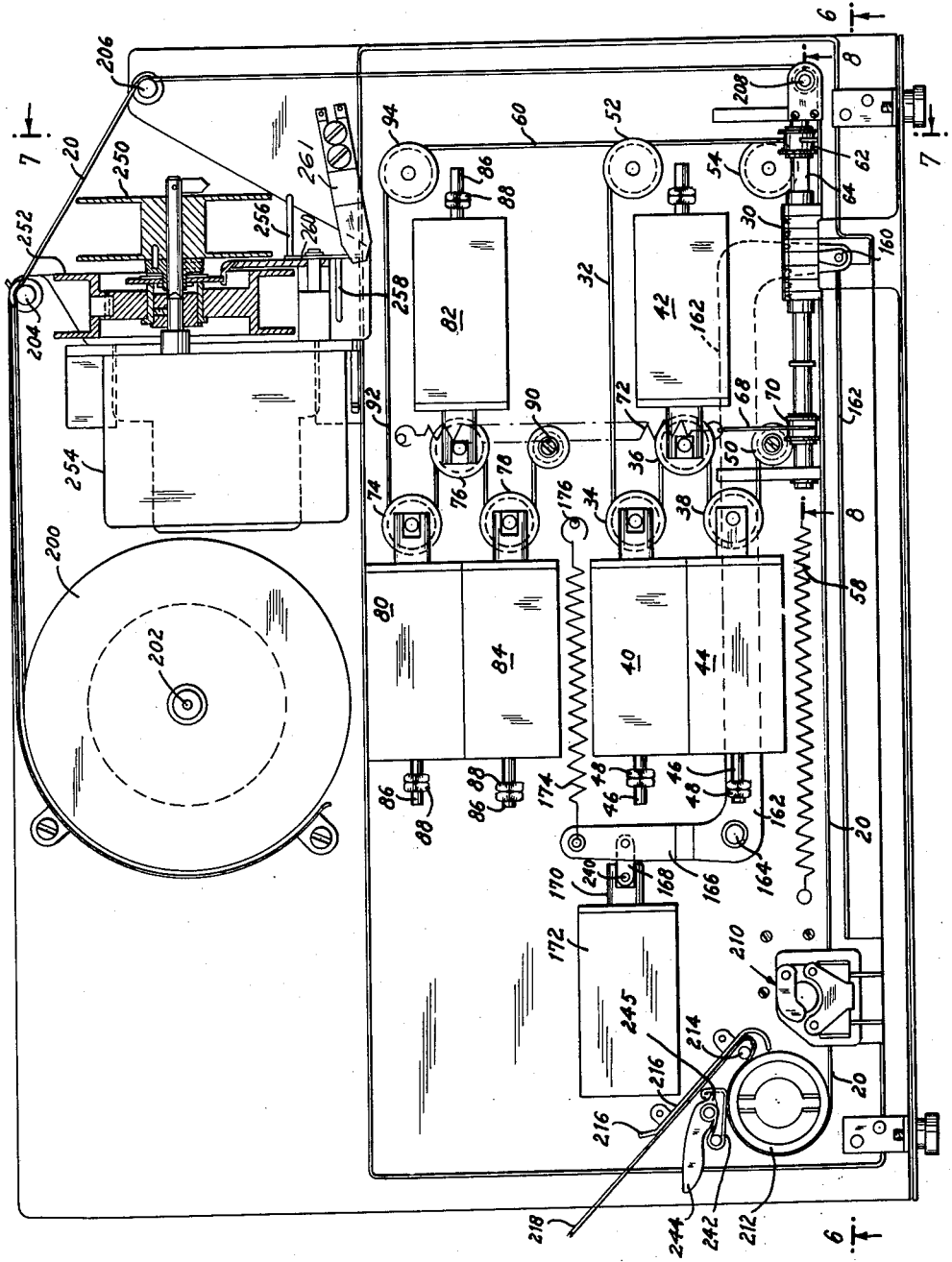

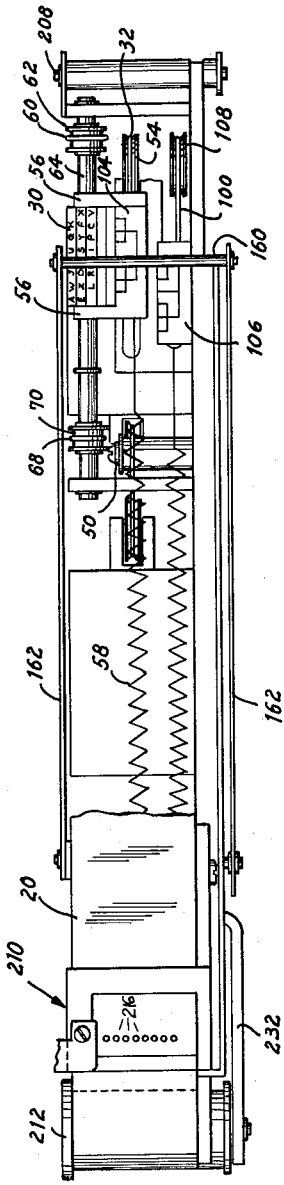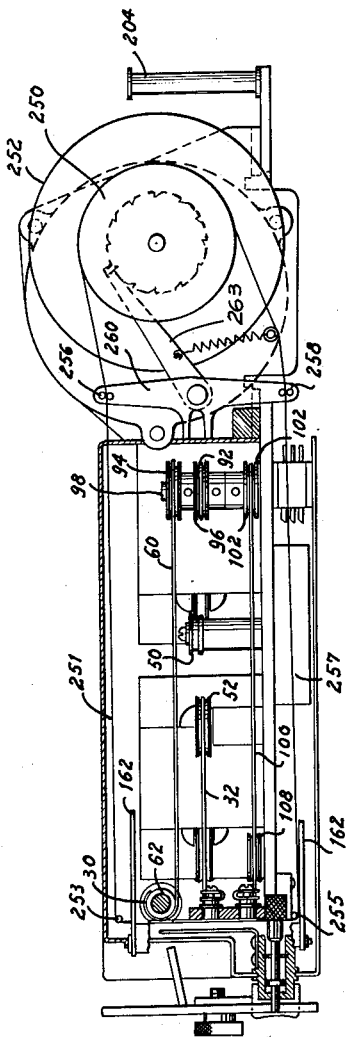

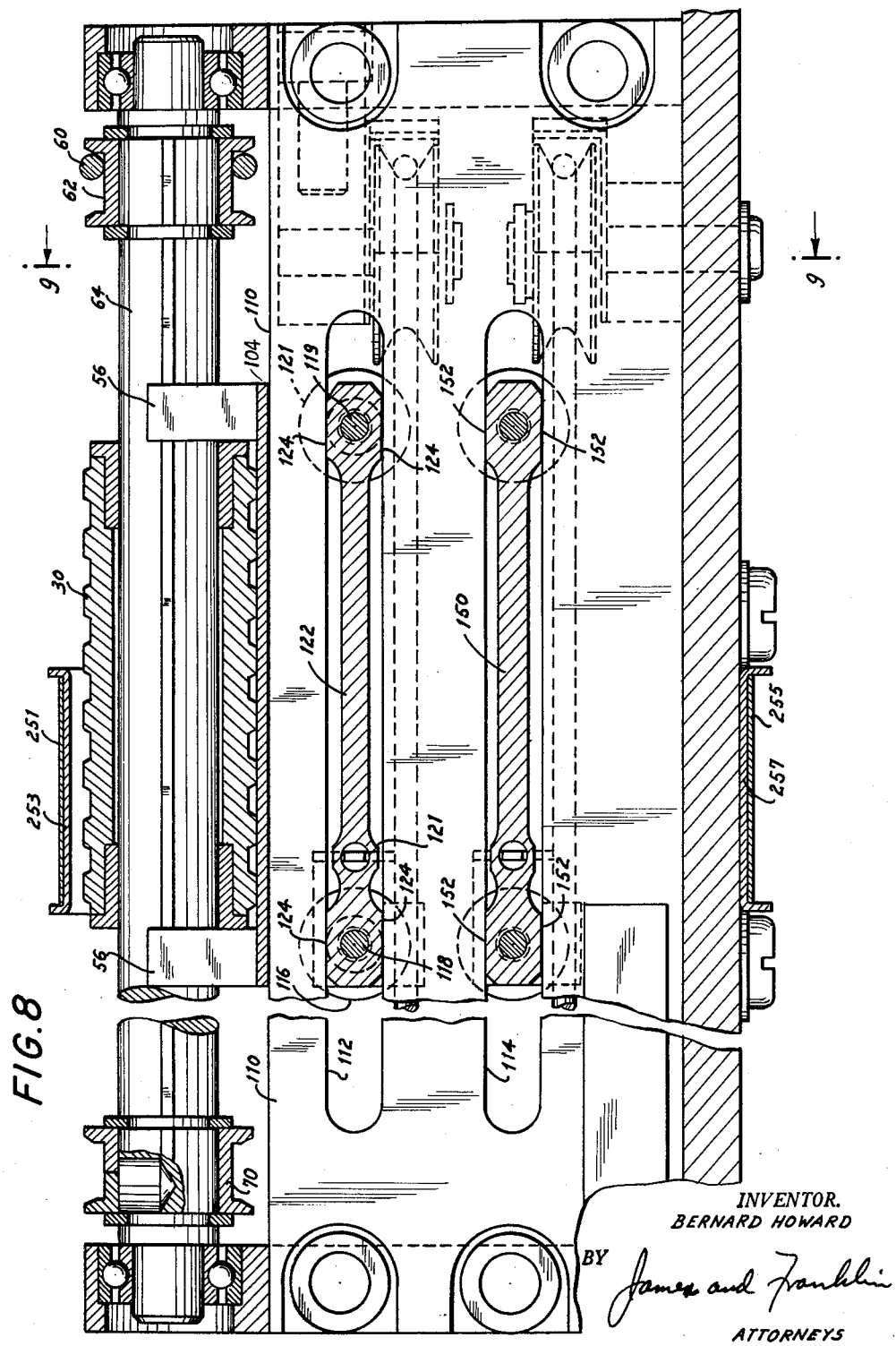

INVENTOR.
BERNARD HOWARD
BY
*James and Franklin*
ATTORNEYS

Feb. 20, 1962
B. HOWARD
3,022,376
DISPLAY TRANSMITTER
Filed Sept. 28, 1959
14 Sheets-Sheet 7
FIG.10
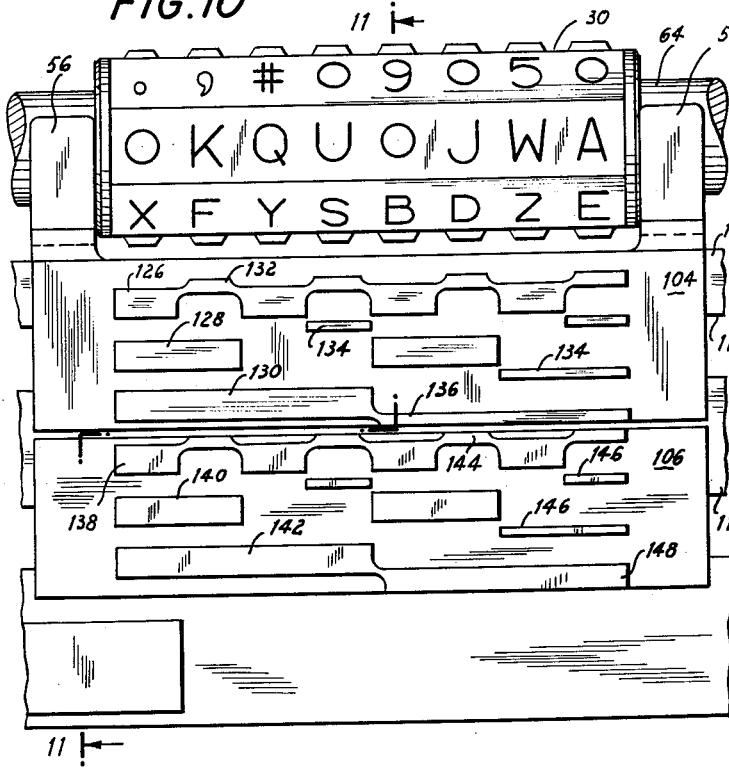
FIG.11
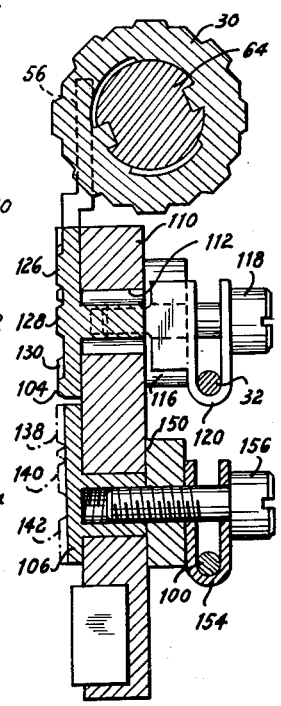
FIG.12
| L | ( | 1 | 7 | F | ' | 2 | - |
|---|---|---|---|---|---|---|---|
| / | ! | 6 | ♡ | ? | $ | " | 3 |
| ; | : | Ø | 8 | & | 4 | ) | LF |
| . | , | # | SP | 9 | CR | 5 | BL |
| L | K | Q | U | F | J | W | A |
| X | F | Y | S | B | D | Z | E |
| V | C | P | I | G | R | L | LF |
| M | N | H | SP | O | CR | T | BL |
INVENTOR.
BERNARD HOWARD
BY James and Franklin
ATTORNEY

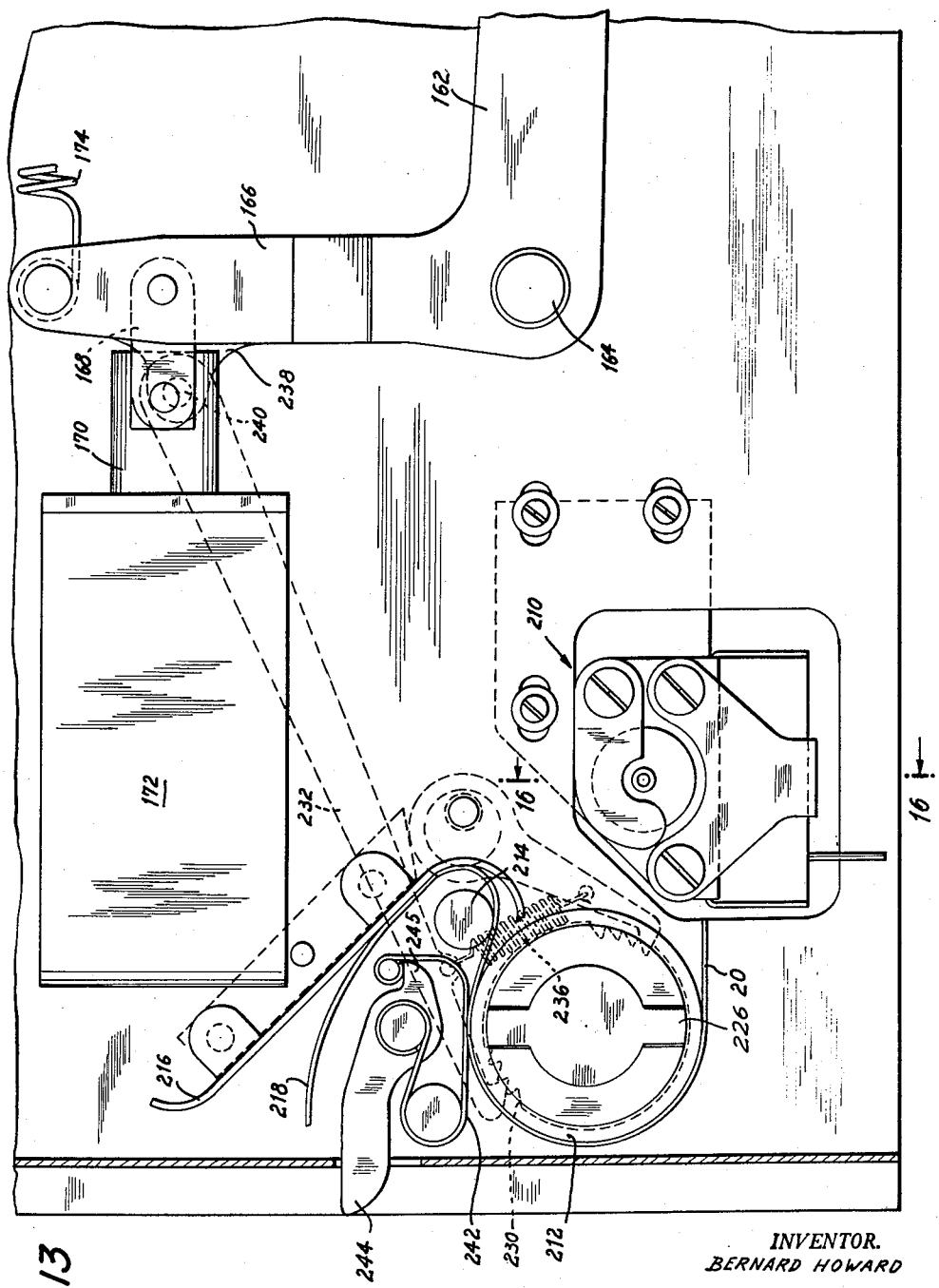

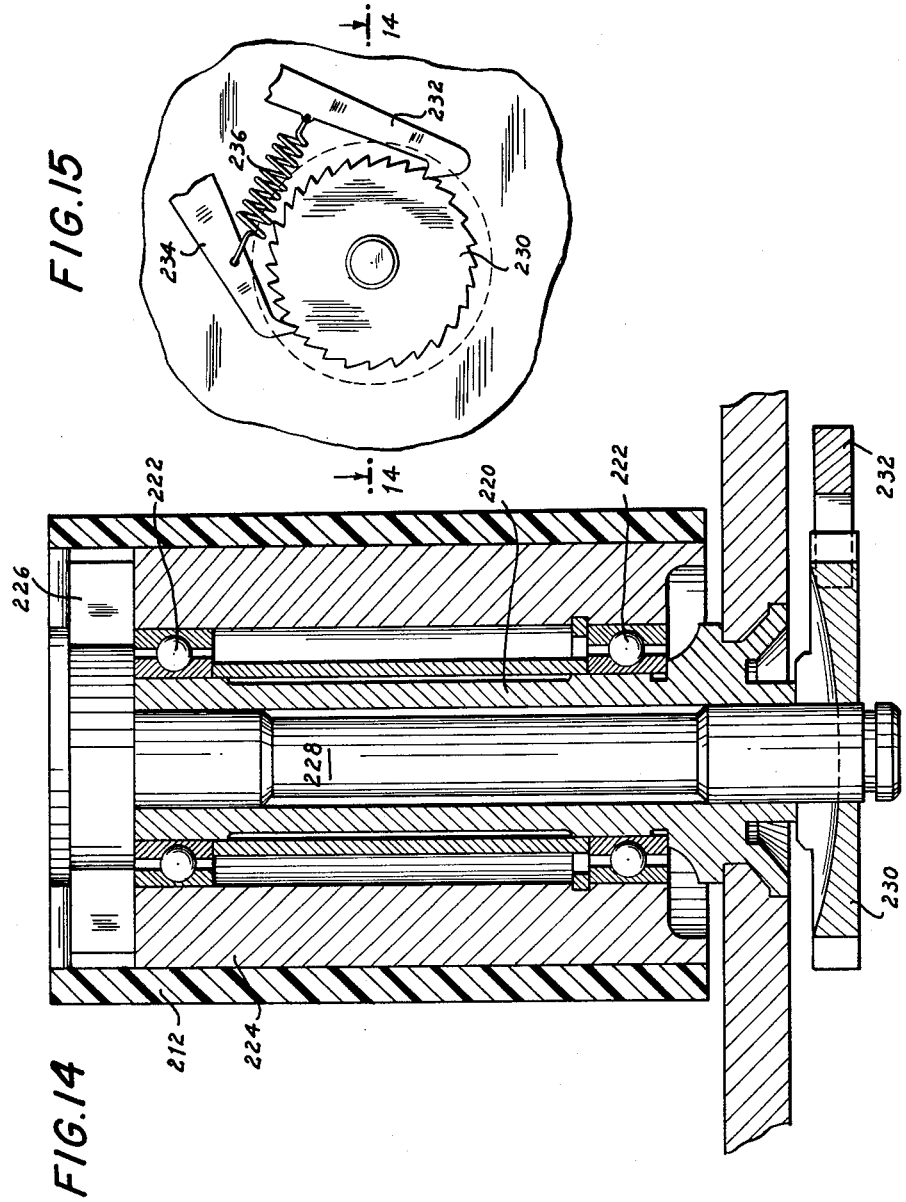

Feb. 20, 1962    B. HOWARD    3,022,376
DISPLAY TRANSMITTER
Filed Sept. 28, 1959    14 Sheets-Sheet 10
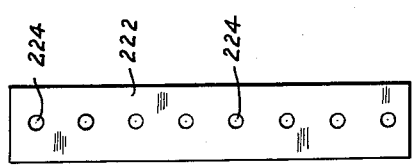
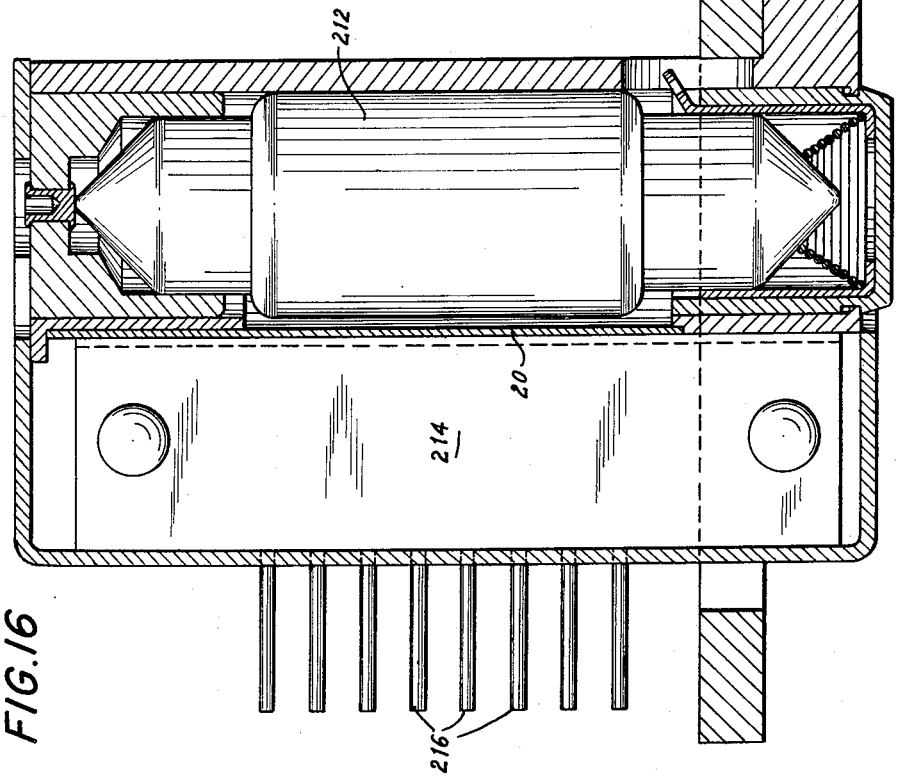
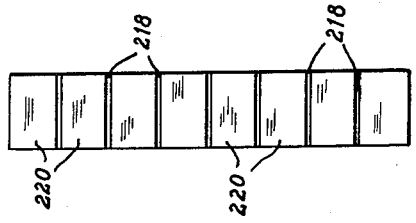
INVENTOR.
BERNARD HOWARD
BY
James and Franklin
ATTORNEYS INVENTOR.
BERNARD HOWARD
BY James and Franklin
ATTORNEYS Feb. 20, 1962   B. HOWARD   3,022,376
DISPLAY TRANSMITTER
Filed Sept. 28, 1959   14 Sheets-Sheet 13

INVENTOR.
BERNARD HOWARD
BY
James and Franklin
ATTORNEYS

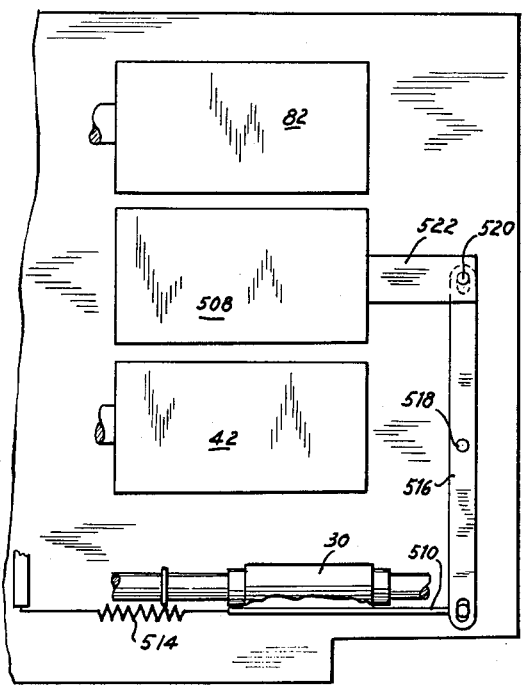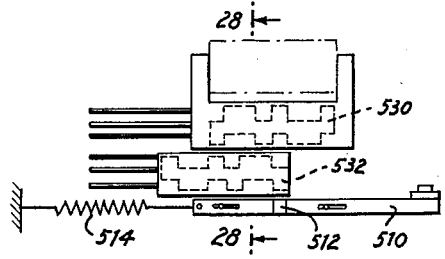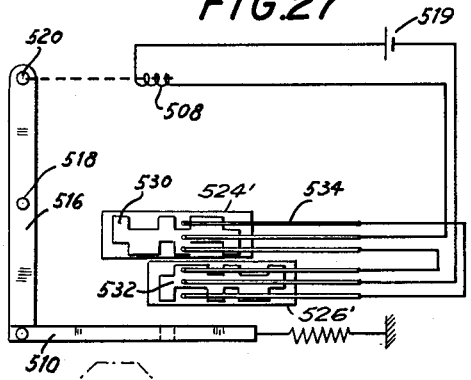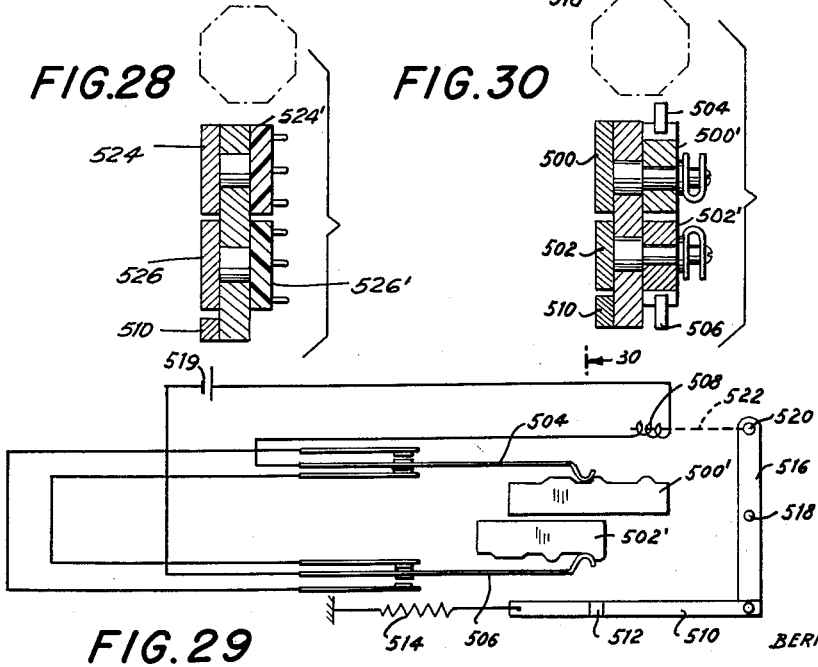

United States Patent Office 3,022,376
Patented Feb. 20, 1962

3,022,376
DISPLAY TRANSMITTER
Bernard Howard, Upper Saddle River, N.J., assignor, by mesne assignments, to Mite Corporation, New Haven, Conn., a corporation of Delaware
Filed Sept. 28, 1959, Ser. No. 842,711
42 Claims. (Cl. 178—81)

This invention relates to telegraph communication, particularly by means of a multiple level code.

The primary object of the present invention is to generally improve telegraph apparatus. A more particular object is to provide error-free telegraphic transmission, whether relaying a received message, or more usually by keyboard transmission of a message of local origin. For this purpose the message, usually a short one, say under one hundred characters, is preliminarily printed in conventional alpha-numeric characters, and simultaneously in code dots corresponding to the said characters in a multiple level code. The line of conventional characters is displayed and proofread for detection of error, and any such error is corrected in both the conventional character and in the code dots.

While I have referred above to telegraphy, the transmission need not necessarily be over a long distance to a remote point. In some cases the transmission may be local, as in programming a computer, where it may be important to proofread for detection of error before feeding the information into the computer.

Another object of the invention is to facilitate any needed correction of a preliminarily printed message. For this purpose the code dots are themselves employed for again printing the message in characters and code, except that this "regenerative" printing of the message is stopped at the error, whereupon the keyboard may be employed to manually print the correction, following which the machine regeneration of the remainder of the message is resumed. The thus corrected message then may be used for automatic transmission.

Another general object of the present invention is to simplify and to reduce the cost of the mechanism required for the present purpose.

To accomplish the foregoing general objects, and other more specific objects which will hereinafter appear, my invention resides in the telegraph apparatus elements, and their relation one to another, as are hereafter more particularly described in the following specification. The specification is accompanied by drawings in which:

FIGURE 1 is a top plan view of apparatus embodying features of the present invention;

FIGURE 2 is a front elevation thereof;

Figure 4:
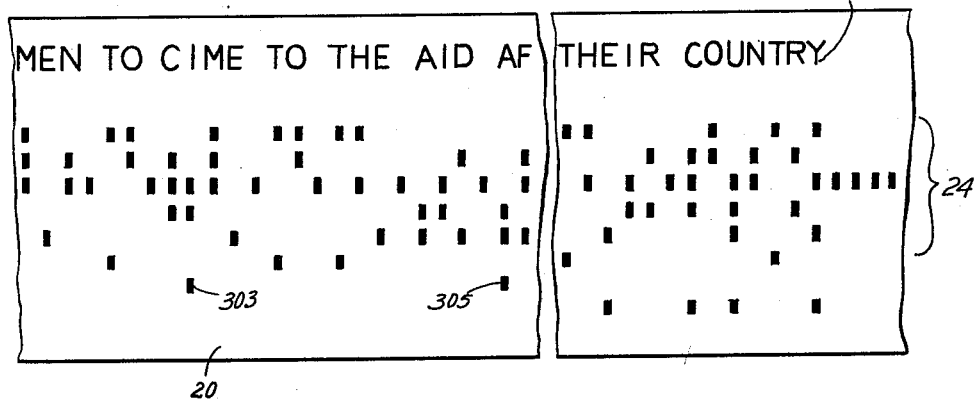
FIGURE 4 shows a piece of the printed tape.
Figure 4A:
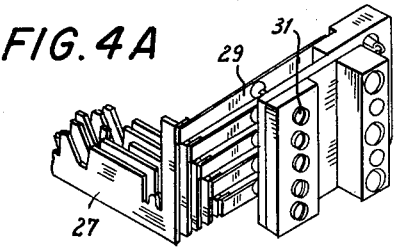
Figure 3:
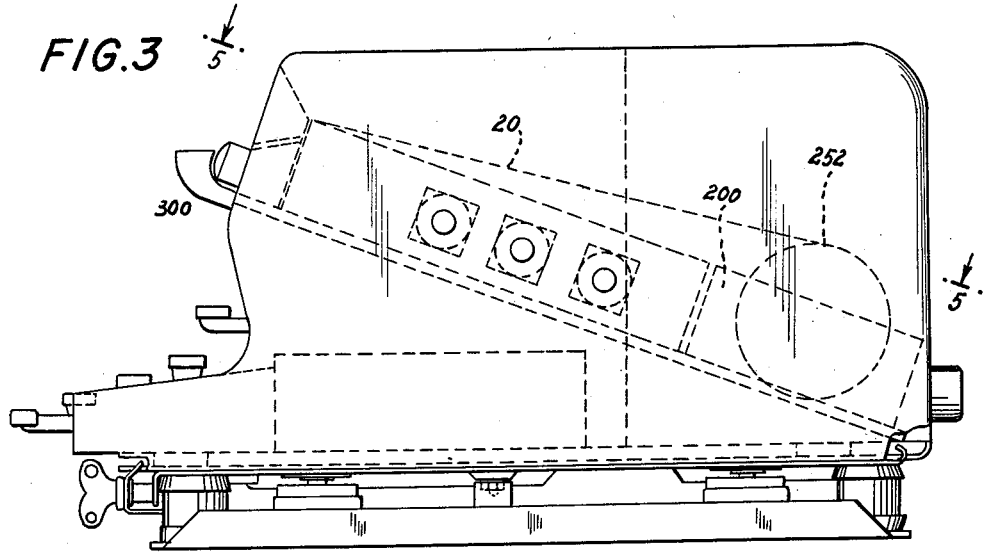
FIGURE 3 is an end view thereof.
Figure 9:
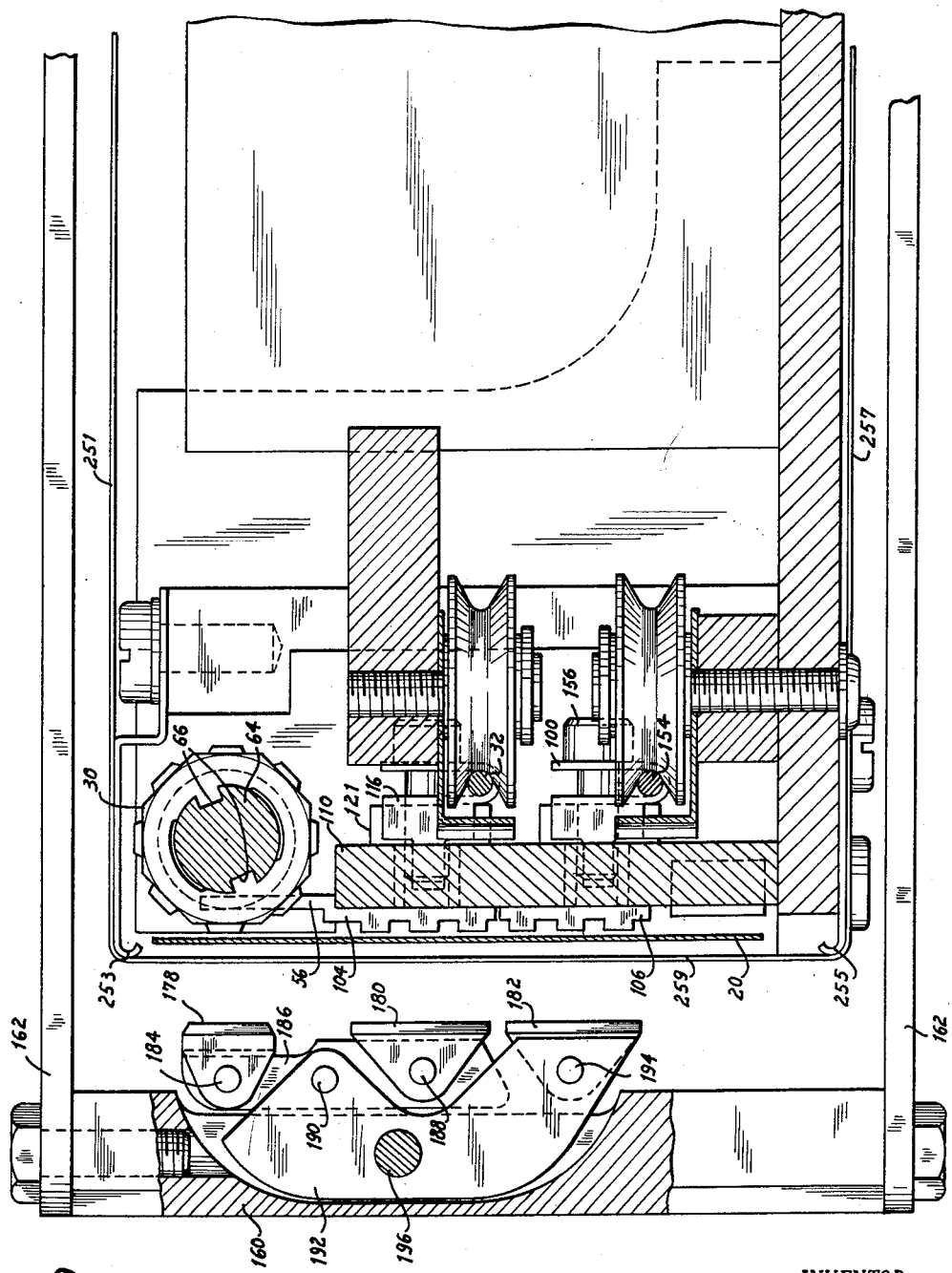
Figure 17:
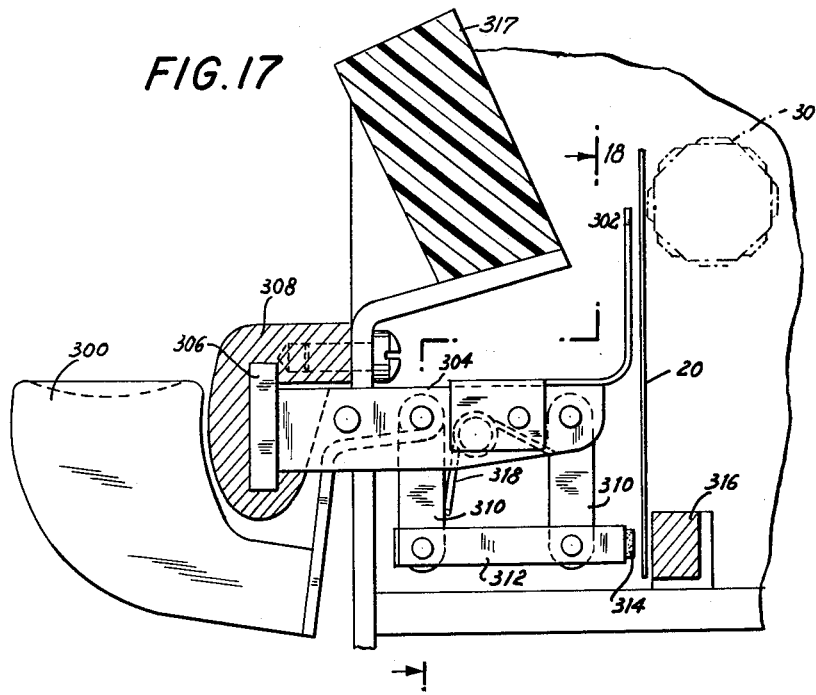
Figure 18:
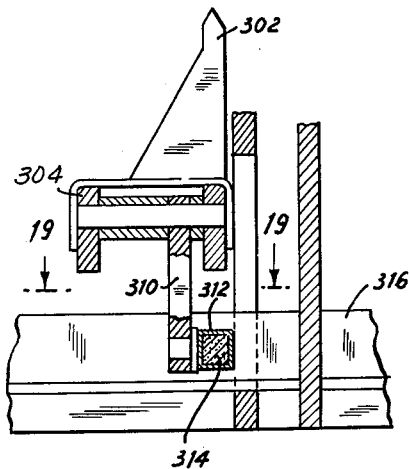
Figure 19:
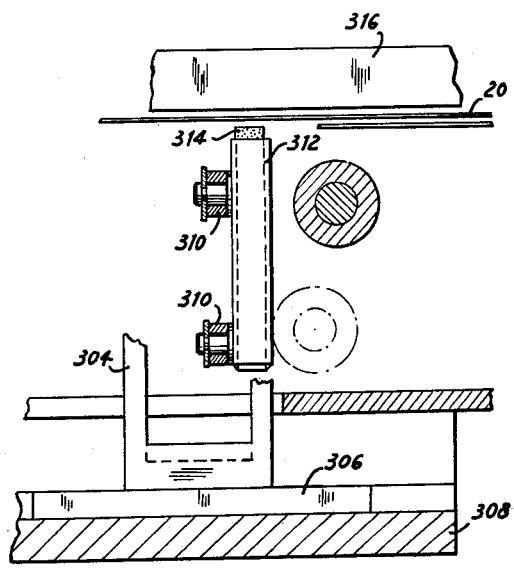
Figure 20:
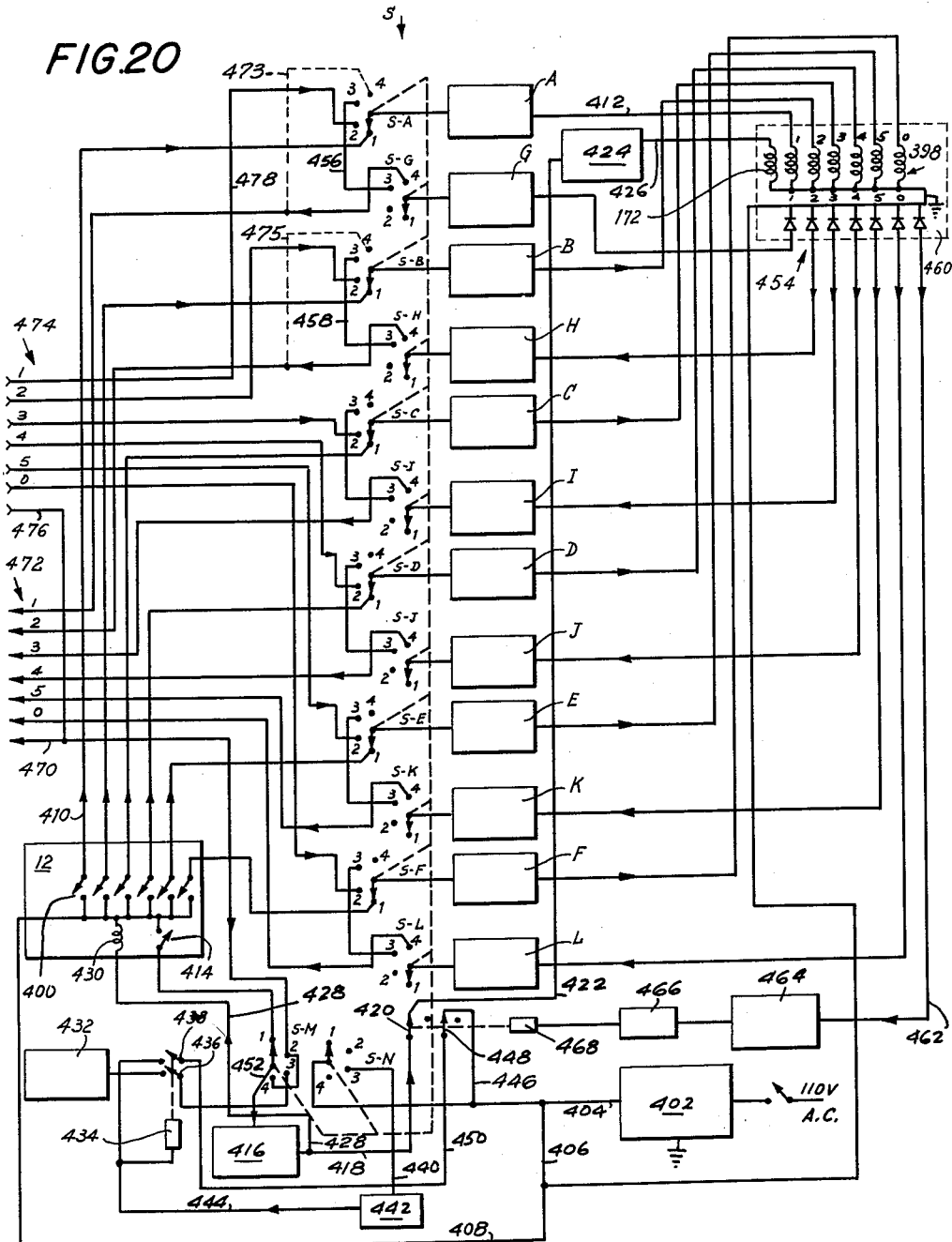
Figure 21:
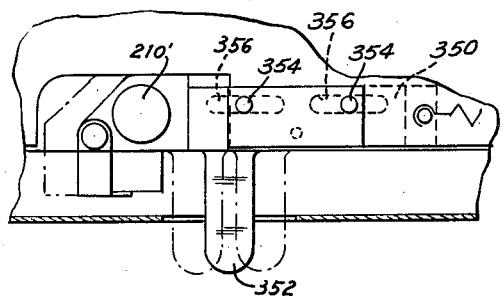
Figure 22:
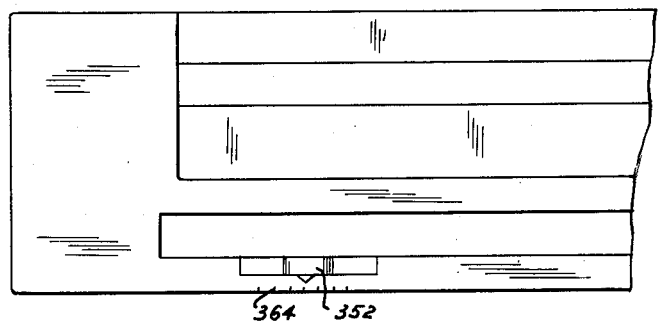
Figure 23:
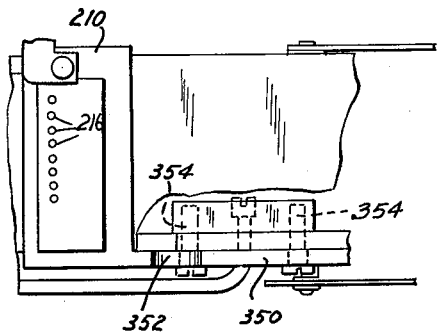
Figure 24:
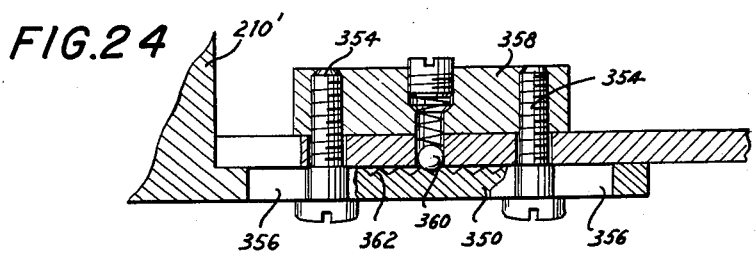

FIGURE 4-A is a perspective view showing a fragment of a keyboard using five notched code bars;

FIGURE 5 is a top plan view with the cover removed, and taken approximately in the plane of the line 5—5 of FIGURE 3;

FIGURE 6 is a front elevation of the mechanism taken approximately in the plane of the line 6—6 of FIGURE 5;

FIGURE 7 is an end view of the mechanism taken approximately in the plane of the line 7—7 of FIGURE 5;

FIGURE 8 is a section drawn to enlarged scale and taken approximately in the plane of the line 8—8 of FIGURE 5;

FIGURE 9 is a transverse section taken approximately in the plane of the line 9—9 of FIGURE 8, but also showing the print hammer;

FIGURE 10 is a front elevation of the type cylinder and code plates;

FIGURE 11 is a section taken approximately in the plane of the line 11—11 of FIGURE 10;

FIGURE 12 is a development of one particular array of letters and numerals which may be used on the type cylinder;

FIGURE 13 is a fragmentary plan view drawn to enlarged scale and corresponding to the lower left corner of FIGURE 5 to show the tape feed mechanism and the reader;

FIGURE 14 is a vertical section through the tape feed mechanism taken approximately in the plane of the line 14—14 of FIGURE 15;

FIGURE 15 is a bottom view explanatory of the pawl and ratchet mechanism of the tape feed mechanism;

FIGURE 16 is a vertical section through the reader;

FIGURES 16-A and 16-B are explanatory of the photocell of the reader;

FIGURE 17 is a vertical section drawn to enlarged scale and showing the correction marker;

FIGURE 18 is a section taken approximately in the plane of the line 18—18 of FIGURE 17;

FIGURE 19 is a fragmentary horizontal section taken approximately in the plane of the line 19—19 of FIGURE 18;

FIGURE 20 is a wiring diagram explanatory of the electrical circuitry of the apparatus;

FIGURE 21 is a fragmentary plan view showing a reader modified to be movable;

FIGURE 22 is a fragmentary front elevation of a transmitter using the same;

FIGURE 23 is a fragmentary front elevation inside the casing, showing the movable reader;

FIGURE 24 is an enlarged fragmentary vertical section showing the detent for the movable reader;

FIGURE 25 s a schematic plan view of optionally usable additional mechanism for adding a "parity bit";

FIGURE 26 is a front elevation explanatory of the same;

FIGURE 27 is a wiring diagram for the same;

FIGURE 28 is a fragmentary section taken approximately in the plane of the line 28—28 of FIGURE 26;

FIGURE 29 is a diagram explanatory of a modified arrangement using cam operated contacts; and FIGURE 30 is a fragmentary section taken approximately in the plane of the line 30—30 of FIGURE 29.

Referring to the drawings, and more particularly to FIGURES 1 and 2, the apparatus comprises a keyboard generally designated 12. This may be used to print a line of conventional alpha-numeric characters (letters and numerals) along the upper edge of a paper tape which is moved in a horizontal direction, and the resulting line of characters is displayed in an elongated slot or window 14. The same tape is simultaneously printed with superposed lines of dots corresponding to the characters in a multiple level code. After typing a one line message, and proof reading the same in the window 14, a control S may be operated, whereupon the code dots are moved past a reader which transmits a signal corresponding to said dots.

The nature of the printed tape will be seen in FIGURE 4 in which the tape 20 receives a line 22 of conventional characters, and also superposed lines of code dots 24 which represent the corresponding characters in a multiple level, in this case a six level code. The characters and the code dots are in vertical alignment transversely of the tape.

The keyboard

Keyboard 12 may be one of a number of known keyboards, and requires no detailed description. It employs an array of keys 26 (FIGURES 1 and 2), each carried on a lever 28 (FIGURE 1) pivoted at the rear of the keyboard. A suitable number, in this case either five or six bars, are disposed edgewise adjacent to one another and are notched on their upper edges with sloping or straight notches so disposed that the depression of any key causes a particular disposition of the bars relative to one another. Such an arrangement of five bars is shown in my copending application Ser. No. 669,098, filed July 1, 1957, and entitled "Keyboard Operated Telegraph Transmitter." At one end the present notched bars move or control corresponding contacts to open or close the same, corresponding to transmission pulses.

This is shown in FIGURE 4-A in which it will be seen that the notched code bars 27 engage movable contacts 29 to move the same relative to stationary contacts which are adjusted at 31. In FIGURE 4-A the keyboard is of the standard telegraph type using five code bars operating in five contacts. This matter is explained in greater detail later in connection with the circuitry and operation of the transmitter, but it may be mentioned here that the keyboard equally well may have six code bars and six contacts. With five contacts as here shown, the sixth contact is operated by keys for "letters" and "figures," with one such key closing and the other opening the said sixth contact, and with the latter being latched in one position or the other until changed by the keys.

In my co-pending application a synchronous motor was employed to time the pulses and to transmit them serially or sequentially, whereas in the present case there is no motor and it is assumed that a multiple wire connection is available so that the pulses of the multiple level code may be transmitted simultaneously instead of sequentially. In any event, depression of a key causes the code bars to assume left or right positions which in turn cause the contacts to be closed or opened, corresponding to the multiple level code for the particular key and the character marked thereon.

*Character selection*

Referring to FIGURES 5, 6, and 7, the characters are provided in raised letters on a type cylinder 30. This is drawn to larger scale in FIGURES 9 and 10 of the drawing. The particular type cylinder here shown is eight characters long, as seen in FIGURE 10, and has eight faces carrying eight characters around the periphery, as seen in FIGURE 9. This provides room for 64 characters, and the development of one particular type cylinder is shown in FIGURE 12. This locates the letters on one half the drum, and the numerals and punctuation on the other half of the drum. Certain blanks at the dotted two letter symbols may be provided for special purposes.

The type cylinder is moved both axially and rotatively for character selection, and the arrangement for this purpose is somewhat like that disclosed in my Patent No. 2,727,944 granted December 20, 1955, and entitled "Telegraph Printer."

Reverting to FIGURES 5, 6, and 7, the type cylinder 30 is moved axially by means of a cable 32 which is threaded around three movable pulleys 34, 36, and 38. These pulleys are moved by solenoids 40, 42, and 44 respectively. The solenoids may have inside springs (not shown) which move the cores and pulleys outward or away from the coil, and this motion is adjustably limited by means of screws 46 carrying lock nuts 48. When the solenoid is energized the pulley is drawn inward to a fixed stop position. The motions are set in multiples, say $\frac{1}{16}''$ for pulley 34, $\frac{1}{8}''$ for pulley 36, and $\frac{1}{4}''$ for pulley 38. (The actual amounts are less.) One end of cable 32 is fixedly secured on a post 50, and this may include a rotatably adjustable element for facilitating adjustment of the length of the cable. The cable 32 passes around a guide pulley 52 where it turns forward, and another guide pulley 54 where it turns sideward toward the type cylinder, to which it is operatively connected.

In FIGURE 6 cable 32 is connected to a yoke 56 disposed around the ends of the type cylinder 30, so that horizontal movement of the yoke causes a corresponding horizontal movement of the type cylinder. The yoke is normally pulled to the left by means of a pull spring 58, and it is pulled to the right by the selector cable 32. It will be evident that different combinations of energization of the three solenoids will establish any of the eight horizontal positions of the type cylinder.

The type cylinder is rotated by means of a cable 60, the forward end of which is wound around a cable drum 62. The latter is mounted on a shaft 64, and referring to FIGURE 9, shaft 64 is splined to receive keys 66 which cause the type cylinder 30 to rotate with the shaft while permitting the type cylinder to slide freely along the shaft. The shaft 64 is normally turned in one direction, as by means of a return cable 68 (FIGURE 5), the forward end of which is wound about a drum 70 in reverse direction to the cable 60, and the rear end of which is connected to a pull spring 72.

Cable 60 (FIG. 5) is itself controlled by three movable pulleys 74, 76, and 78, which in turn are moved between an "out" position and an "in" position by energization of solenoids 80, 82, and 84 respectively. As before, the pulleys normally move outward, and if desired compression springs may be provided behind the solenoid cores for this purpose, the outward movement being adjustably limited by screws 86 carrying lock nuts 88. The adjustment is made such as to provide movement in multiples, and this movement is preferably made identical to that of cable 32, for example $\frac{1}{16}''$, $\frac{1}{8}''$, and $\frac{1}{4}''$ for the respective pulleys. One end of the cable is fixedly secured on a post 90, and this connection is preferably made adjustable by means of the screw and wheel shown.

As so far described, it may be assumed that cable 92 is a continuation of cable 60, with a direction change at pulley 94. However, for a reason next explained it is convenient to separate the cables, and referring to FIGURE 7, the cable 92 is secured to a wheel 96 locked on a vertical shaft 98. Another wheel 94 is locked to the shaft 98 and wheel 96, and the cable 60 is secured to wheel 94. The operating effect is as though cables 60 and 92 were an integral cable, but the present arrangement provides a convenient change in the height of cable 60, and it also facilitates the provision of still another cable 100 and wheel 102 for a purpose described later.

It will be understood that depression of a key of the keyboard transmits energy to the different solenoids, and thus determines the selection of a particular character on the type cylinder which is to be disposed in front of a print hammer (later described), thereby causing printing of the selected character.

*Code dot selector*

The code dots corresponding to the printed character are themselves printed by means of two relatively horizontally movable plates 104 and 106 (FIGURES 6 and 10), which are disposed edge to edge beneath the type cylinder 30, and which are slidable in the direction of the axis of the type cylinder, in this case horizontally. These plates have embossed dots, and one plate, preferably the upper plate 104, is moved with the cylinder 30 when the latter is moved axially, while the other plate 106 is moved in response to rotation of the cylinder 30.

This is done by means of the cable 100 passing around a guide pulley 108 and connected to wheel 102 (FIGURE 7) as previously mentioned. Cable 100 therefore has exactly the same motion as the cable 60 which causes rotation of the cylinder, and the increments of this motion are made equal to the horizontal spacing of the letters on the type cylinder. The drum 62 on which cable 60 is wound is made of appropriate diameter to produce $\frac{1}{8}$ turn of the cylinder for each increment of cable movement. Alternatively, drum 62 could differ in diameter, and wheel 94 differ correspondingly.

These parts are all shown to larger scale and in greater detail in FIGURES 9, 10 and 11. The plates are slidable in front of, and are guided by, a stationary guide plate 110. This plate is horizontally slotted to form guide tracks which are best shown at 112 and 114 in FIGURE 8, which shows the front of plate 110. Referring to FIGURE 11, a projection on plate 104 projects rearward through slot 112 and is held in position on the plate by means of a washer 116 and a screw 118. The latter may additionally hold a reversely bent sheet metal clip or clamp 120 in which the cable 32 is secured. The rearward projection affords clearance even though the screw is tightened, as it must be to securely clamp the cable 32. Referring to FIGURE 8, the extra hole 121 receives a tab bent forward from the cable clip to prevent rotation of the clip. The washer and screw are shown at 116, 118, and a similar screw and washer, but without a clip, are located at 119 and 121 respectively.

Referring to FIGURE 8, the plate 104 has a relatively long rib 122 cast integrally with it and received in the slot 112. The end portions of the rib are enlarged to form bearing surfaces 124 which actually slide on the edges of slot 112.

In FIGURES 9–11 the plate 104 is formed with projections or bosses on three levels indicated in FIGURE 10 at 126, 128, and 130. These form dots, and of course the dots are sometimes omitted and sometimes required. In addition some further narrow support projections may be provided above and between and below the lines of dots, as indicated at 132, 134, and 136, but these are merely for support of the paper tape when struck by the hammer. It is not essential to provide so many narrow support projections, and I have operated with complete success while using only the top and bottom projections, and omitting the middle projection 134.

It will be understood that the yoke 56 previously referred to is conveniently made as upward extensions of the ends of the plate 104. These extensions are disposed immediately in front of and therefore do not interfere with the splined shaft 64, but they engage the ends of the type cylinder, and move the same with the plate 104, which in turn is moved by the cable 32 as previously described.

The lower plate 106 is similarly provided with bosses on its front face to cause the printing or the omission of dots where desired, this being done on three levels indicated in FIGURE 10 at 138, 140, and 142. Here again narrow support projections may be provided above, between, and below the lines of dots as indicated at 144, 146, and 148, but projections 146 are superfluous.

The plate 106, like the plate 104, has a rearward projection 150 (FIGURE 8) which passes through the lower guide slot 114. The projection 150 may be narrow for most of its length, but is enlarged at 152 to provide bearing surfaces which slide along the edges of the slot 114. The plate is held on the fixed guide plate 110 by means of washers and screws received in mating holes, and in addition a reversely bent clip 154 (FIGURE 11) may be screwed to the plate by means of screw 156 to lock the lower cable 100 in position. The construction is the same as for the upper plate.

Reverting to FIGURE 4, it will be recalled that there are six lines of dots 24. These are shown narrow, from side to side, instead of wide as in FIGURE 10. The width depends on the width of the hammer, which is narrow as in FIGURE 4. The extra width in FIGURE 10 provides tolerance in the axial movement of the type cylinder. The dots are shown to be rectangular, and are preferably made that way, but they could be round or other shape. Indeed, for some purposes of the invention, perforations may be employed in lieu of printed dots, and the term "dot" is intended to be generic to both a printed dot and a perforation, but the term "printed dot" refers to dots which are printed with ink as here described.

It will be understood from the foregoing description that the upper plate will assume any of eight positions, and the lower plate will independently assume any of eight positions, and the binary combinations of the two plates will provide 64 different combinations of dots, corresponding to the 64 character spaces on the type cylinder.

*Print hammer*

Referring to FIGURE 5, the print hammer bar is located at 160 and is carried to the right end of a lever 162 pivoted at 164. This has an angle arm 166 connected by link 168 to the core 170 of a solenoid 172, so that energization of the solenoid causes the lever to move counterclockwise and so causes the hammer to strike. The hammer is normally moved away from the type by means of a return spring 174 connected to the arm 166 and to a fixed pin 176.

Referring now to FIGURE 6, it will be seen that there are top and bottom levers 162 disposed above and below the print mechanism, and the hammer bar 160 is disposed vertically between the top and bottom levers.

The hammer could be a fixed bar, as so far described, but preferably is provided with self-adjustable hammer faces. The construction is shown in detail in FIGURE 9, in which hammer bar 160 is carried between top and bottom levers 162, and itself carries three independently movable hammer faces 178, 180, and 182. The hammer 178 is pivoted at 184 on an equalizing bar 186. Hammer 180 is pivoted at 188 on the other end of the equalizing bar 186, and the latter itself is pivoted at 190 on another equalizing bar 192. Hammer 182 is pivoted at 194 on the other end of the equalizing bar 192, and the latter is pivoted at 196 on the fixed hammer bar 160. The result of this arrangement is that hammer 178 may adjust itself to the type cylinder; hammer 180 may adjust itself to the upper plate 140; and hammer 182 may adjust itself to the lower plate 106; and all of the hammers may move in far enough to reach the type cylinder or plate because the pressure is equalized on all of the hammers, regardless of any slight misalignment of the characters and code dots.

The hammer need not be as complex as here shown, and I have successfully used a hammer consisting of only two hammer faces, the upper one being short and properly located for printing the character on the type cylinder, and the lower one being long and properly located for printing all of the dots on both slide plates. In such case the only support bosses needed on the plates are the top boss of the upper plate and the bottom boss of the lower plate (132 and 148 in FIGURE 10), with all of the intermediate support bosses being omitted. Even the top boss is not needed where there is a top dot, and similarly the bottom boss is not needed where there is a bottom dot, as will be seen in FIGURE 10.

The hammer solenoid 172 is energized in a manner which is explained later when describing the circuitry and operation of the transmitter. When the keyboard is being used the solenoid is energized under control of the keyboard and therefore by the operator, regardless of timing, whereas during transmission the hammer is actuated at a clock rate, as will be described later.

*Tape feed*

Referring to FIGURE 5, tape 20 is supplied from a tape roll 200 pivoted at 202. The tape is guided at 204 and 206 to another guide 208 where it is turned sidewardly and runs along the front of the print mechanism. It is led to a reader, generally designated 210, and thence around a tape feed drum 212 to a guide 214 where it is turned reversely and is led out of the printer along a guide plate 216, as shown at 218. The used tape may be dropped loosely in a bin, or may be wound up on a frictionally driven take-up reel, as desired.

The tape is fed step by step following each printing action of the hammer, and for this purpose it is convenient to use the return motion of the hammer to cause the feed of the tape. The mechanism for this purpose is best shown in FIGURES 13, 14, and 15, referring to which the tape 20, after passing through the reader 210, is drawn around the frictionally surfaced drum 212.

This is freely rotatable on a hollow upright guide post 220 (FIGURE 14), and the latter may be provided with anti-friction bearings 222.

The frictional surface member 212 is secured to a cylinder 224, the upper end of which is secured at 226 to a drive shaft 228 which passes through the fixed post 220. At its lower end the drive shaft 228 carries a ratchet wheel 230, best shown in FIGURE 15. The latter is moved by a feed pawl 232, and is held against reverse movement by a stop dog 234. Both are urged toward ratchet wheel 230 by a pull spring 236. Referring now to FIGURE 13, the feed pawl 232 is connected at its other end to the arm 166 of hammer lever 162, and for this purpose the lower one of the two arms 166 may be provided with an ear 238 to which the pawl 232 is pivoted at 240. The return movement of the hammer following each print operation moves the ratchet wheel and consequently the tape feed drum, which in turn advances the tape one increment corresponding to the desired spacing between successive characters.

The paper tape is held frictionally against the drum 212 by means of a spring 242. The latter may be released by means of a lever 244. This facilitates threading the tape around the drum when putting a new tape in the machine.

The manner in which lever 244 relieves the spring pressure will be clear from inspection of FIGURE 13, for movement of lever 244 downward causes its opposite end 245 to move upward, thereby moving the spring 242 away from the paper feed drum. The path of the paper around guide 214 and along plate 216 is also clearly shown in FIGURE 13.

*Ribbon feed*

The ribbon passes in front of the paper tape, between the paper and the hammer. It has been omitted in most of the drawings in order not to hide other parts of the mechanism. It may be a standard inked ribbon such as is used in typewriters, in which case it passes across the paper in upright direction. It may be parallel to the hammer bar, but preferably is at a slight angle in order to make full use of the width of the ribbon.

The ribbon feed mechanism may be of any desired type, but a preferred form, and that shown here, is the one disclosed in my co-pending application Serial No. 824,641 filed July 2, 1959, and entitled "Ribbon Feed Mechanism." Referring to FIGURE 5, the ribbon may be supplied from a ribbon spool 250 (shown empty) and is taken up on a concentric ribbon spool 252, these being driven by a clock type motor with reduction gearing, generally designated 254. The ribbon passes through ribbon slots formed at 256 and 258, and referring to FIGURE 7, it will be seen that these are at the ends of a rocker 260. This operates a reversing switch for the motor, shown at 261 in FIGURE 5, thereby reversing the direction of movement of the ribbon when the end of the ribbon is approached, as marked by the usual eyelet which engages the ribbon slot. In the present case the ribbon slot is formed between two adjacent rods at each end of rocker 260. The spool 250 is driven positively, while the spool 252 is driven frictionally through a slip clutch, and the latter can turn in one direction but not the other by reason of a pawl 263 (FIGURE 7) engaging ratchet teeth on its periphery.

When spool 250 acts as a supply spool, the take-up spool 252 attempts to move at a higher linear speed because of its greater diameter, and the clutch slips as needed. On reversal, when spool 250 acts as a take-up spool, and spool 252 would attempt to release ribbon too fast, the pawl 263 prevents rotation of the friction drive means, so that the drive means becomes a brake means for holding back the spool 252, but only frictionally, so that it releases ribbon as fast as it is actually pulled by the positively driven take-up spool 250.

The path of the ribbon is shown in FIGURES 7 and 9, it passing horizontally forward at 251 around a guide at 253 where it turns downward to another guide at 255, where it turns rearward as shown at 257. The vertical portion of the tape is shown at 259' in FIGURE 2. The ribbon is transverse to the paper tape, and is generally upright. However, it may be, and preferably is, at a slight angle so that the ribbon is used over most of its width instead of only in the center, and this arrangement of the ribbon is suggested at 259' in FIGURE 2. To dispose the ribbon at an angle fits in well with the particular ribbon feed here employed because of the axial displacement of the spools 250 and 252 which displacement anyway exists in the ribbon feed as shown in FIGURE 5.

*The code reader*

The code reader is shown at 210 in FIGURES 5 and 6. It is shown in section in FIGURE 16, this being taken transversely of the paper tape 20. In FIGURE 16 a long-filament lamp 212 is mounted in upright position behind the tape 20, and a photocell unit 214 is disposed in front of the tape. This unit has terminals generally designated 216 for electrical connection to the individual photocells.

Referring to FIGURE 16-A the photocell may be of the silicon type made, for example, by Hoffman Electronics Corp. of Evanston, Illinois, and the particular one here used is their unit HPC-8-01. The element comprises laminations, and the contact area of the cell on one side (remote from the tape) is left intact for a common connection or ground return, while the other side (facing the tape) is slotted part way through the thickness of the cell by a series of slots shown at 218, thus forming individual cells 220.

A plate with apertures to admit light is disposed in front of the multiple cell shown in FIGURE 16-A, and this plate is shown in FIGURE 16-B, it being a polished plate 222 having openings 224 which are disposed in registration with the line of dots on the paper tape, and which also register with the cells 220 of FIGURE 16-A.

Eight cells are provided, of which seven are used, while the eighth is used if the remote telegraph receiver is made to employ a "parity bit," as described later.

*Correction marker*

Referring to FIGURES 1 and 2, the message printed in conventional characters is exposed in a horizontal slot or window 14. There is also a manually operable slide button 300 and a pointer 302, which are slidable from side to side for the length of the exposed message line.

Referring now to FIGURES 17, 18 and 19, the button 300 is mounted on and carries with it a frame 304 having a shoe 306 slidable in a track or guideway 308. The frame 304 has depending links 310 which carry a trough or tube 312. The latter is preferably rectangular in section, as is best shown in FIGURE 18, and it contains an ink saturated wick or marker 314 which is exposed at the inner end remote from the button. The ink saturated material for printing the error dot may be a self-inking rubber stamp material such as that sold by National Cash Register Co.

FIGURE 17 shows how pointer 302 and marker 314 are disposed adjacent the paper tape 20. The print cylinder 30 is located near the top of the tape (but ahead of the range of movement of the pointer) while the marker 314 is near the bottom. A support rail 316 extends horizontally behind the tape near its lower edge. A window 317 also may extend horizontally in the window through which the message and pointer are seen.

Depression of button 300 (FIGURE 17) will turn the links 310 and marker 314 toward the paper, thus printing a dot on the paper. The marker is normally urged away from the paper by a return spring 318.

In practice, when an error is detected in the displayed message, the button 300 is moved sidewardly until pointer 302 points to the error, whereupon the button is depressed to form a mark on the tape corresponding to the location of the error. One of the photocells in the reader responds to this mark and stops the regeneration tape feed when the mark is reached, thus permitting a corrected character to be applied manually by operation of the keyboard. In FIGURE 4 error dots are shown at 303 and 305.

At the end of the message line the operator preferably uses the error button to print another dot, like an error dot, but in this case one which acts as a stop dot. This dot serves to automatically stop transmission or regeneration of the message when the end of the message is reached. Such a dot is provided after first typing the message, and another such dot is again provided at the end of the regenerated message.

Circuitry and operation

The electrical circuitry is shown in FIGURE 20. The six solenoids for moving the pulleys for character selection are shown at 398, while the seventh solenoid for actuating the hammer is shown at 172. The photocells corresponding to the lines of dots are shown at 454.

In describing the wiring diagram, it will be assumed that the operator is first setting up a message by use of the keyboard 12. At this time the operator turns a gang switch S to position 1, and it will be noted that this gang switch has 14 sections which are marked S–A through S–M.

An operator working the keyboard 12 is in effect closing or not closing one or more of the normally-open parallel information contacts indicated at 400. When a contact is closed, it supplies energy from D.C. power supply 402 through conductors 404, 406, and 408 to the lower contacts 400 and thence to terminal 1 of the appropriate section or sections of the gang switch. For example, if the level #1 contact of contacts 400 is closed at the keyboard, current is supplied through wire 410 to switch section S–A and thence to amplifier A and then through wire 412 to the pulley solenoid for level 1. This is typical of the six levels, the other switch sections and amplifiers being section S–B and amplifier B for level 2, section S–C and amplifier C for level 3, section S–D and amplifier D for level 4, section S–E and amplifier E for level 5, and section S–F and amplifier F for level 0. The parallel currents from the various contacts establish the pulley positions and thus select the appropriate character to be printed.

At the same time the depression of any key on the keyboard closes a start contact 414 which energizes the hammer, but only after a slight delay to allow time for character selection. For this purpose energy from line 408 flows through contact 414 to contact 1 of gang switch section S–M and thence through conductor 452 to a delay unit 416, in this case a monostable multivibrator, from which energy flows through line 418 to normally closed relay contact 420, and thence through line 422 to an amplifier 424, the output of which flows through a conductor 426 to the hammer solenoid 172, thus operating the hammer.

The output of delay unit 416 at conductor 418 also flows through another conductor 428 to a keyboard release solenoid 430. The keyboard has a mechanical interlock such that a second key cannot be depressed, even after the first key has been released, unless and until the previous character has been printed, as indicated by actuation of the hammer. It is this interlock which is released by solenoid 430, thus freeing the keys for further operation.

With the particular electrical system here shown, the pulley solenoids all return after each printing operation, and the print cylinder goes back to a neutral position which has a blank ("BL" in FIGURE 12). However, with different circuitry the cylinder could progress from its last print position to its next print position, without going back to a neutral position.

The hammer actuating solenoid 172 receives a pulse rather than a continued current, and therefore returns immediately after actuation, and during its return the tape is fed one step, as previously described.

This operation continues until the message has been typed. The operator then reads the line for correctness, and if correct may transmit the same as later described. However, assuming an error is detected, the operator next marks the position of the error by using the slide 300 (FIGURES 1 and 2), which is moved until the pointer points to the incorrect character, at which time the button is depressed to make a mark at a level below level "0," as previously explained. If there is more than one error, an appropriate number of dots may be applied at the errors. This is shown at 303, 305, FIG. 4.

The operator next turns the gang switch to position 3, which starts reprinting the message on a next section of tape. The feed of the tape is produced by the print solenoid as previously described, but the pulses for actuating the print solenoid are supplied from a clock pulse generator 432. When the gang switch is in position 3, its section S–N energizes a solenoid 434 which closes contact 436 and also a holding contact 438. For this purpose energy is supplied from power supply 402 through conductor 404 to section S–N and thence through its contact 3 and conductor 440 to pulse former 442 and conductor 444 to relay solenoid 434. At the same time power flows from conductor 404 to conductor 446 and normally closed contact 448 and thence through conductor 450 to holding contact 438, which leads to relay solenoid 434 so that when the relay is closed it remains closed.

The clock pulse generator 432 may consist of a sine wave oscillator and a squaring amplifier. Its output flows through the now closed contacts 436 to contact 3 of gang switch section S–M, which then is closed, and thence through conductor 452 to the hammer delay unit 416, which as before has an output running through conductors 418, contacts 420, conductor 422, amplifier 424, and conductor 426, to the hammer solenoid 172. This operates the hammer but the hammer does not print because the print cylinder and the embossed plates are at this time in a rest or blank position called "BL" in FIGURE 12. This tape feed may continue repeatedly until any blank space at the left of the message being regenerated has moved past the reader.

When, however, the first character reaches the reader, the dots are disposed in front of the cells, indicated generally at 454. There is a drop in current output of the cell, and the cells are connected to amplifiers which act also as inverters, and which provide an amplified increase in current. Specifically, the cell for level 1 is connected to amplifier G; the cell for level 2 is connected to amplifier H; the cell for level 3 is connected to amplifier I; the cell for level 4 is connected to amplifier J; the cell for level 5 is connected to amplifier K; and the cell for level 0 is connected to amplifier L.

Taking amplifier G as typical, its output flows through contact 3 of gang switch section S–G, thence through conductor 456 to contact 3 of switch section S–A, and thence to amplifier A to provide energization through conductor 412 of pulley actuating soleniod 1, as previously described for the keyboard operation. In similar fashion, a dot at level 2 causes amplifier H to supply an output through conductor 458 to amplifier B, and thence to the pulley solenoid for the No. 2 level, and so on.

Thus there is a character selection based on the code dots beneath the previously printed characters. This continues at a clock rate determined by the clock pulse generator 432, until the error dot reaches the reader.

When the error dot is reached, the cell 460 responds, and the decrease in current manifests itself through conductor 462 at amplifier 464, which acts as an inverter, and its output pulse is shaped in a pulse former 466, to momentarily energize the relay solenoid 468 which opens the contacts 420 and 448 previously referred to. The opening of contact 420 disables the hammer, because the contact is in series with the hammer solenoid circuit. This prevents printing of the incorrect character.

It will be recalled that the holding current for relay coil 434 was supplied through relay contact 448, conductor 450, and contact 438, to the coil 434. The opening of the contact 448 of relay 468 opens the holding current of relay coil 434, whereupon contacts 436 and 438 open and remain open, thus disabling the hammer and tape feed from further operation, so that the tape remains stationary. The pulse former 466 provides a narrow pulse, so that relay coil 468 is quickly de-energized, and the contacts 420 and 448 again close, but the momentary opening of contact 448 is sufficient to open relay 434, which then remains open.

At this time the operator turns the gang switch to position 1 and depresses the correct key for the correct character, whereupon the gang switch is restored to position 3, so that feeding of the tape and regeneration of the message is resumed until another correction dot (if there was more than one error) is reached. The correction procedure then may be repeated, until the entire line or message has been reprinted correctly. The machine stops when a stop dot is reached as previously described. The operator, after proof reading the line, then may transmit the reprinted corrected message.

As here shown, the transmitted output is a parallel information output using six conductors with a ground return. This is feasible for nearby utilization, but for distant communication the parallel output may be converted to serial output in any of a number of known ways, unnecessary to describe here. For example, the parallel output may perforate a tape which then provides a serial output. Converters for this purpose are known and available.

For transmission the operator turns the gang switch to position 4. It is assumed that there is synchronization with an external clock which serves to synchronize the transmitter and the receiver. The synchronizing line is shown at 470, and is connected to both contact 2 and contact 4 of gang switch section S–M, and with the switch in position 4, the synchronizing pulse is fed through conductor 452 to the hammer delay unit 416. The output then leads to the hammer actuating solenoid, all as previously described, and results in a step-by-step tape feed in synchronism with the receiver, as determined by the external clock.

At this time the photo reader provides pulses through the amplifiers G through L, and these are connected through contacts 4 of the respective gang switch sections G through L to the parallel lines 1 through 5 and 0, indicated generally at 472. These lead to the remote receiver, to which the message is being sent.

With the wiring as so far described, the message is not locally printed on the tape during transmission. However, if that be desired, it may be arranged readily by connecting the contacts #4 of sections G through L to not only the external parallel lines 472, as here shown, but also to the amplifiers A through F, which are connected to contacts 1 of the switch sections. This added connection is indicated by the broken line connection 473 between contact 4 of section G to contact 4 of section A, and similarly the broken line connection 475 of contact 4 of section H to contact 4 of section B, it being understood that similar connections will be provided for the remaining sections I to C, J to D, K to E, and L to F.

This feature is particularly desirable in certain systems, e.g. an airline reservation system where the information stored in the memory deals with the identification of a passenger. In such cases that information must be repeated into the line along with the reservation request corresponding to each leg of his proposed journey. The operator can set this information up in the keyboard once, and repeat it over the line as often as is required.

The printer of the present equipment also may be used to print an incoming message. For this purpose the gang switch is provided with a fourth position which, in the present case, is numbered 2. With the gang switch in position 2, parallel information input conductors, generally designated 474, are made operative, as well as a clock connection 476 which leads also to wire 470 and thence through contact 2 of switch section S–M to the hammer delay unit 416, for timed or clock operation of the hammer, as previously described. Taking input conductor 1 as an example, it leads through wire 478 to contact 2 of switch section S–A, and thence to amplifier A and wire 412 to pulley (character selector) solenoid 1. In similar fashion, the other input conductors 474 are connected to amplifiers B through F, and thence to the remaining pulley solenoids.

The incoming message then will be printed on the tape, and the code dots corresponding to the same will also be printed therebeneath. If the incoming message is limited to the span of the unit, say one hundred characters long, this message could be corrected and retransmitted by appropriate utilization of the parts previously described. However, ordinarily the message simply will be printed as received, the device at this time being used simply as an ordinary receiver.

So far the use of a six level code has been assumed. Standard telegraph communication over long lines is usually with a five level serial code. This difference occasions no difficulty because the converter which converts the parallel information to serial information may do so in a five level serial code.

The keyboard may use six code bars and six contacts, or it may use a five level keyboard having five notched bars. A standard keyboard for the five level code differs importantly from a typewriter keyboard in having a "figures" key and a "letters" key, which must be pressed when changing from letters to figures, or vice versa. The five contacts at the ends of the notched bars (FIG. 4–A) are supplemented by a contact operated by the "figures" and "letters" keys it being closed by one and opened by the other and remaining so. This supplementary contact leads to the sixth pulley solenoid, and that solenoid is the one which provides the largest travel of the three solenoids which rotate the type cylinder. It is the zero level solenoid in the diagram of FIGURE 20.

With this arrangement the "figures" contact or switch holds until the "letters" key is depressed, or vice versa, and this may be done in varied ways, as by latching one key down until the other is depressed, or more preferably by latching the switch operated by the keys until the other key is depressed. The right end or "0" contact of the keyboard contacts 400 shown in FIGURE 20 is the contact which is closed for "figures" and opened for "letters," or vice versa.

*Movement of reader*

As so far described, the correction consists of the one-for-one substitution of a correct character for an incorrect character. However, there may be cases in which the error requires the insertion of additional characters. For example, if the word "the" has been typed instead of the correct word "these," it will be necessary to insert two additional characters, and in the opposite case to subtract characters. To provide room for this, the reader head may be movable to the left or right to permit addition or deletion of characters. A construction for this purpose is shown in FIGURES 21–24.

Referring to those figures, the reader 210' is like that previously described, but in this case is mounted on a slide 350 which has a forwardly projecting handle 352. The slide may be moved to the left or right, it being carried on bearing screws 354 which pass through slots 356 in slide 350. The screws 354 also hold a block 358 which carries a detent pawl 360 (FIGURE 24), and the latter is pressed yieldably against serrations 362 in the top of slide 350. The spacing of the serrations corresponds to the spacing of the type, that is, the step-by-step feed of the tape.

Thus, if the error requires the insertion of characters, the handle 352 is moved one or more steps to the left, as indicated by number on an appropriate scale suggested at 364 in FIGURE 22. To add or remove one or more characters the handle is moved to the left or right of mid-position an appropriate number of steps.

When a new message is being typed the reader is restored to mid-position.

Addition of "parity bit"

It is desirable in many machine language systems to add to the code which contains only intelligence bits, an additional bit which may be called a "parity bit," and which is intended to satisfy some predetermined rule. For example, it may be desired that all code groups utilized in the system will contain an even number of marking pulses. The system will then contain an appropriate device which will detect the presence of an odd number of bits, and so recognize the existence of an error.

Several ways in which this may be done are illustrated in FIGURES 25 to 30 of the drawings. In all cases these sources make use of the code slides previously described, that is the slides for printing the code dots and marked 104, 106 in FIGURE 10.

Referring first to FIGURE 30, the slides 500 and 502, which are embossed in front to print the dots, here carry rear slides 500' and 502'. The front and rear slides move in unison. Referring now to FIGURE 29, there are projections or camming bumps on the upper edge of the slide 500'. The cam projections are located at each point where an odd number of printing bosses occur, and omitted where an even number of printing bosses occur. The camming bumps operate contacts 504 and 506, and these control circuits which are in series.

When both plates have camming bumps, the outer contacts are closed and a solenoid 508 is energized from a power source 519. When neither plate has a camming bump, as shown in FIGURE 29, the inner contacts are closed and the solenoid is energized. However, if only one plate or the other has a camming bump, the solenoid is not energized.

An additional dot printing plate 510 is provided, this having a boss at 512 at the location of the print hammer. This occurs when plate 510 is pulled to the right against a return spring 514, and referring to FIGURE 25, the plate 510 is pulled to the right by lever 516 pivoted at 518 and connected at 520 to the core 522 of solenoid 508. When the solenoid is de-energized, plate 510 moves to the left and no additional dot is printed. FIGURE 29 is schematic and shows the front of plate 510, the top of lever 516, and the rear plates 500' and 502'.

When plates 500 and 502 each have an odd number of bosses and also when they each have an even number of bosses, the sum of the bosses is always an even number, and in such case the extra dot will not be printed. On the other hand, when the sum of the bosses is an odd number, the extra dot will be printed. However, it should be understood that the arrangement could be reversed in that the dot could be printed for an even number of bosses and omitted for an odd number of bosses. In either case, an even or an odd number of marking pulses would always be printed, as may be decided upon and desired.

A modified arrangement using slide contacts instead of cams is shown in FIGURES 26, 27, and 28 of the drawing. In FIGURE 28 the printing slides 524 and 526 are secured to back slides 524' and 526'. The front and back slides move together. The back slides are made of insulation material.

Referring now to FIGURES 26 and 27 of the drawings, printed circuits are provided on back of the insulation slides. The shape of the printed or conductive area is shown in broken outline at 530 and 532 in FIGURE 26, and in solid outline in FIGURE 27, this being a rear view. The printed areas are engaged by contacts or feelers, there being six of these indicated at 534, and these are connected in circuit with solenoid 508 and power source 519 as shown in FIGURE 27. It will be evident that the same result is attained, that is, an even number of bosses will close the circuit and energize the solenoid while an odd number of bosses will open the circuit and de-energize the solenoid. Thus the slide 510 will be actuated through lever 516 by the solenoid 508, and the extra dot for the desired "parity bit" will be printed or not printed, as may be appropriate.

The solenoid 508 may conveniently be located between the selector solenoids 42 and 82 shown in FIGURE 5, there being a vacant space between these solenoids in which solenoid 508 may be placed. This is shown in FIGURE 25 with solenoid 508 located between solenoids 42 and 82.

The manner in which the parity bit is used is not shown or described in detail here, for it is utilized at the remote receiver which receives the message being transmitted by the present transmitter. The remote receiver has facilities to differentiate between an odd number or an even number of dots, and to signal an alarm in the event the wrong number is received.

It is believed that the construction and operation of my improved display transmitter, as well as the advantages thereof, will be apparent from the foregoing detailed description. There are many situations in which the usual message may be comparatively short. This applies to messages for ticket and other reservations; weather information to airplanes; and in certain military applications. Often it is short because it is abbreviated by code symbols. However, in these cases it is important that the message be perfectly accurate. With the present apparatus the operator may print the message at his own typing speed, and with any necessary pauses or delays, following which the message may be reviewed for accuracy, and corrected if inaccurate, and then when transmitted, it is transmitted at a uniform optimum transmission speed.

It will be understood that while I have shown and described my invention in several preferred forms, changes may be made in the structures shown, without departing from the scope of the invention as sought to be defined in the following claims. In the claims the term dot, when not said to be "inked," is not intended to exclude other dots such as perforations.

I claim:

1. A display transmitter comprising a keyboard for producing coded electrical pulses, a printer responsive to coded electrical pulses located at and responsive to said keyboard to print a line of characters and to simultaneously print a plurality of superposed lines of inked dots corresponding to said characters in a multiple level code, means affording visible display of said line of characters for possible correction, a code reader for producing coded electrical pulses in response to said dots, and transmission means responsive to said reader.

2. A display transmitter comprising a printer responsive to coded electrical pulses to print a line of characters and to simultaneously form a plurality of superposed lines of dots corresponding to said characters in a multiple level code, means affording visible display of said line of characters for possible correction, a code reader for producing coded electrical pulses in response to said dots, regeneration means whereby the reader may actuate the printer to reproduce the line of characters with opportunity for correction of the same, transmission means adapted to respond to said reader, and switch means whereby the reader may be used either for regeneration or for transmission.

3. A display transmitter comprising a keyboard for producing coded electrical pulses, a printer responsive to coded electrical pulses located at and responsive to said keyboard to print a line of characters and to simultaneously form a plurality of superposed lines of dots corresponding to said characters in a multiple level code, means affording visible display of said line of characters for possible correction, a code reader for producing coded electrical pulses in response to said dots, regeneration means whereby the reader may actuate the printer to reproduce the line of characters with opportunity for correction of the same, transmission means adapted to respond to said reader, and switch means whereby the reader may be used either for regeneration or for transmission.

4. A display transmitter comprising a printer responsive to coded electrical pulses to print a line of characters and to simultaneously print a plurality of superposed lines of inked dots corresponding to said characters in a multiple level code, means affording visible display of said line of characters for possible correction, a code reader for producing coded electrical pulses in response to said dots, regeneration means whereby the reader may actuate the printer to reproduce the line of characters with opportunity for correction of the same, transmission means adapted to respond to said reader, and switch means whereby the reader may be used either for regeneration or for transmission.

5. A display transmitter comprising a keyboard for producing coded electrical pulses, a printer responsive to coded electrical pulses located at and responsive to said keyboard to print a line of characters and to simultaneously print a plurality of superposed lines of inked dots corresponding to said characters in a multiple level code, means affording visible display of said line of characters for possible correction, a code reader including photocells for producing coded electrical pulses in response to each line of dots, regeneration means whereby the reader may actuate the printer to reproduce the line of characters with opportunity for correction of the same, transmission means adapted to respond to said reader, and switch means whereby the reader may be used either for regeneration or for transmission.

6. A display transmitter comprising a keyboard for producing coded electrical pulses, a printer responsive to coded electrical pulses located at and responsive to said keyboard to print a line of characters and to simultaneously form a plurality of superposed lines of dots corresponding to said characters in a multiple level code, means affording visible display of said line of characters for possible correction, a code reader for reading said dots and producing electrical pulses in response thereto, transmission means responsive to said reader and including output conductors, input conductors for actuating the printer from an outside coded pulse signal, and switch means for causing the printer to respond to either an outside coded pulse signal, or to the local keyboard.

7. A display transmitter as defined in claim 1 which includes input conductors for actuating the printer from an outside signal, and switch means for causing the printer to respond to either an outside signal or the local keyboard.

8. A display transmitter as defined in claim 3 which includes input conductors for actuating the printer from an outside signal, and switch means for causing the printer to respond to either an outside signal, or the local keyboard, or the reader when regenerating the signal.

9. A display transmitter as defined in claim 5 which includes input conductors for actuating the printer from an outside signal, and switch means for causing the printers to respond to either an outside signal, or the local keyboard, or the reader when regenerating the signal.

10. A printer for printing a line of characters and for simultaneously printing a plurality of superposed lines of inked dots corresponding to said characters in a multiple level code, said printer comprising a type cylinder, means for moving the same axially, means for rotating said cylinder, two plates disposed edge to edge beneath the type cylinder and slidable in the direction of the axis of the type cylinder, said plates each having embossed dots, means whereby one of said plates moves with the cylinder when the latter is moved axially, and means for moving the other plate in response to rotation of the cylinder.

11. A printer for printing a line of characters and for simultaneously printing a plurality of superposed lines of inked dots corresponding to said characters in a multiple level code, said printer comprising a type cylinder, means for moving the same axially, means for rotating said cylinder, two plates disposed edge to edge beneath the type cylinder and slidable in the direction of the axis of the type cylinder, said plates each having embossed dots, means whereby one of said plates moves with the cylinder when the latter is moved axially, means for moving the other plate in response to rotation of the cylinder, a hammer for simultaneously printing from the cylinder and plates both a character and the code dots corresponding thereto, and tape feed means actuated by movement of the hammer.

12. A printer for printing a line of characters and for simultaneously printing a plurality of superposed lines of inked dots corresponding to said characters in a multiple level code, said printer comprising a type cylinder, a cable for moving the same axially, a second cable for rotating said cylinder, two plates disposed edge to edge beneath the type cylinder and slidable in the direction of the axis of the type cylinder, said plates each having raised dots, means whereby one of said plates and the cylinder move together when the latter is moved axially, a third cable for moving the other plate, and means whereby the second and third cables are moved in unison.

13. A printer for printing a line of characters and for simultaneously printing a plurality of superposed lines of inked dots corresponding to said characters in a multiple level code, said printer comprising a type cylinder, a cable for moving the same axially, a second cable for rotating said cylinder, two plates disposed edge to edge beneath the type cylinder and slidable in the direction of the axis of the type cylinder, said plates each having raised dots, means whereby one of said plates and the cylinder move together when the latter is moved axially, a third cable for moving the other plate, means whereby the second and third cables are moved in unison, a hammer for simultaneously printing from the cylinder and plates both a character and the code dots corresponding thereto, and tape feed means actuated by movement of the hammer.

14. A display transmitter comprising a printer to print a line of characters and to simultaneously print a plurality of superposed lines of inked dots corresponding to said characters in a multiple level code, means affording visible display of said line of characters for possible correction, a code reader including a photocell for each line of dots, and transmission means responsive to said reader, a type cylinder which is movable axially and rotatively for printing the characters, a dot print means separate from the type cylinder but moved simultaneously with the type cylinder, means for feeding a paper tape in a horizontal direction in front of the type cylinder and the dot print means, means for feeding an inked ribbon transversely of the paper tape in front of the said tape, and a hammer for striking the ribbon and paper against both the cylinder and the dot print means.

15. A display transmitter as defined in claim 4 in which the characters are printed by means of a type cylinder which is movable axially and rotatively, and in which the dots are printed by dot print means separate from the type cylinder but moved in simultaneously with the type cylinder, means for feeding a paper tape in a horizontal direction in front of the type cylinder and the dot print means, means for feeding an inked ribbon transversely of the paper tape in front of the tape, and a hammer for striking the ribbon and paper against the cylinder and dot print means.

16. A display transmitter as defined in claim 1 in which the characters are printed by means of a type cylinder which is movable axially and rotatively, and in which the dots are printed by dot print means moved in simultaneously with the type cylinder, means for feeding a paper tape in a horizontal direction in front of the type cylinder and the dot print means, means for feeding an inked ribbon transversely of the paper tape in front of the tape, and a hammer for striking the ribbon and paper against the cylinder and dot print means on a vertical line, said ribbon being disposed at a slight angle to the vertical to better utilize the width of the ribbon.

17. A display transmitter comprising a printer to print a line of characters and to simultaneously print a plurality of superposed lines of inked dots corresponding to said characters in a multiple level code, means affording visible display of said line of characters for possible correction, a code reader including a photocell for each line of dots, and transmission means responsive to said reader, a type cylinder which is movable axially and rotatively for printing the characters, two embossed plates for printing the dots, said plates being disposed edge to edge beneath the type cylinder and arranged for horizontal movement parallel to the axis of the type cylinder, means causing one of said plates to move with the type cylinder when the latter moves axially, means causing the other plate to move horizontally in response to rotation of the type cylinder, means for feeding a wide paper tape in a horizontal direction in front of the type cylinder and the plates, means for feeding an inked ribbon transversely of the paper tape in front of the said tape, and a hammer having a vertically elongated face for striking the ribbon and paper against both the cylinder and plates on a vertical line.

18. A display transmitter as defined in claim 4 in which the characters are printed by means of a type cylinder which is movable axially and rotatively, and in which the dots are printed by means of two embossed plates disposed edge to edge beneath the type cylinder and arranged for horizontal movement parallel to the axis of the type cylinder, means causing one of said plates to move with the type cylinder when the latter moves axially, means causing the other plate to move horizontally in response to rotation of the type cylinder, means for feeding a wide paper tape in a horizontal direction in front of the type cylinder and the plates, means for feeding an inked ribbon transversely of the paper tape in front of the tape, and a hammer having a vertically elongated face for striking the ribbon and paper against the cylinder and plates on a vertical line.

19. A display transmitter as defined in claim 1 in which the characters are printed by means of a type cylinder which is movable axially and rotatively, and in which the dots are printed by means of two embossed plates disposed edge to edge beneath the type cylinder and arranged for horizontal movement parallel to the axis of the type cylinder, means causing one of said plates to move with the type cylinder when the latter moves axially, means causing the other plate to move horizontally in response to rotation of the type cylinder, means for feeding a wide paper tape in a horizontal direction in front of the type cylinder and the plates, means for feeding an inked ribbon transversely of the paper tape in front of the tape, and a hammer having a vertically elongated face for striking the ribbon and paper against the cylinder and plates on a vertical line, said ribbon being disposed at a slight angle to the vertical to better utilize the width of the ribbon.

20. A display transmitter as defined in claim 3 comprising an additional means including a pointer slidable along the displayed characters for forming an error dot at the location of an error, and means in the reader responsive to the error dot to arrest further regeneration transmission, thereby affording an opportunity to correct the error by manual operation of the keyboard.

21. A display transmitter as defined in claim 5 comprising an additional means including a pointer slidable along the displayed characters for printing an error dot at the location of an error, and means in the reader responsive to the error dot to arrest further regeneration transmission, thereby affording an opportunity to correct the error by manual operation of the keyboard.

22. A display transmitter as defined in claim 3 in which the code reader is mounted for slidable movement to the left or right relative to a normal position and is provided with detent means for positioning it in increments corresponding to the spacing between successive characters on the tape, whereby a correction may be made which involves the insertion or removal of characters.

23. A display transmitter as defined in claim 5 in which the code reader is mounted for slidable movement to the left or right relative to a normal position and is provided with detent means for positioning it in increments corresponding to the spacing between successive characters on the tape, whereby a correction may be made which involves the insertion or removal of characters.

24. A display transmitter comprising a printer to print a line of characters and to simultaneously make a plurality of superposed lines of dots corresponding to said characters in a multiple level code, means affording visible display of said line of characters for possible correction, a code reader including a photocell for each line of dots, transmission means responsive to said reader, two plates disposed edge to edge beneath the type cylinder and arranged for horizontal movement, said plates being embossed to make the code dots, and means to make an additional dot acting as a parity bit, said two plates having cooperating means to actuate said parity dot means in order to cause making of the parity bit dot, depending on whether the sum of the bosses on the two plates is odd or even.

25. A display transmitter as defined in claim 1 in which there are two embossed plates disposed edge to edge beneath the type cylinder and arranged for horizontal movement, said plates being embossed to print the code dots, and a third plate beneath the two, said third plate having an embossed dot acting as a parity bit, and in which the two plates have cooperating means to move the third plate to cause printing of the parity bit, depending on whether the sum of the bosses on the two plates is odd or even.

26. A display transmitter comprising a printer to print a line of characters and to simultaneously form a plurality of code symbols which may be machine read, support means to support and to afford visible display of said line of characters for possible correction, an indicator slidably mounted for movement along said support means in order to permit the operator to point to a character which is to be corrected, and means associated with said indicator to add an additional error-indicating symbol which may be machine read, in order to assist subsequent correction of the error.

27. A display transmitter comprising a keyboard, a printer located at and responsive to said keyboard to print on a tape a line of characters and to simultaneously form a plurality of code symbols which may be machine read, means for supporting a desired length of said tape to afford visible display of said line of characters for possible correction, an indicator slidably mounted for movement along said tape support means in order to permit the operator to point to a character which is to be corrected, and means associated with and movable with said indicator to add to the tape an additional error-indicating symbol which may be machine read, in order to assist subsequent correction of the error.

28. A display transmitter comprising a printer to print a line of characters and to simultaneously form a plurality of superposed lines of dots corresponding to said characters in a multiple level code, support means to support and to afford visible display of said line of characters for possible correction, a code reader for reading said dots, transmission means responsive to said reader, an indicator mounted for sliding movement along said line of characters to point to an error, means associated with said indicator to provide an additional error indicating dot which may be read by a reader, and regeneration and transmission means responsive to said readers.

29. A display transmitter comprising a keyboard, a printer located at and responsive to said keyboard to print on a tape a line of characters and to simultaneously form a plurality of superposed lines of dots corresponding to said characters in a multiple level code, support means to support and to afford visible display of said line of characters for possible correction, a code reader for reading said dots, transmission means responsive to said reader, an indicator mounted for sliding movement along said tape and said line of characters to point to an error, means associated with and movable with said indicator to provide on said tape an additional error indicating dot which may be read by a reader, and regeneration and transmission means responsive to said readers.

30. A display transmitter comprising a printer to print a line of characters and to simultaneously print a plurality of superposed lines of inked dots corresponding to said characters in a multiple level code, support means to support and to afford visible display of said line of characters for possible correction, a code reader including a photocell for each line of dots, an indicator mounted for sliding movement along said line of characters to point to an error, means associated with said indicator to print an additional ink dot which may be read by a photocell reader, and regeneration and transmission means responsive to said readers.

31. A display transmitter comprising a keyboard, a printer located at and responsive to said keyboard to print on a tape a line of characters and to simultaneously print a plurality of superposed lines of inked dots corresponding to said characters in a multiple level code, support means to support and to afford visible display of said line of characters for possible correction, a code reader including a photocell for each line of dots, an indicator mounted for sliding movement along said tape and said line of characters to point to an error, means associated with and movable with said indicator to print on said tape an additional ink dot which may be read by a photocell reader, and regeneration and transmission means responsive to said reader.

32. Apparatus for forming a plurality of superposed lines of dots corresponding to characters in a multiple level code, said apparatus comprising two elongated plates disposed edge-to-edge and slidable longitudinally, said plates each having embossed dots, selector means to move the plates independently back and forth to provide different combinations of superposed dots, means to move a tape in front of both plates in a direction longitudinally of the slides, and a hammer having a long narrow hammer face disposed transversely of the direction of movement of the plates and movable toward and away from the plates and tape.

33. Apparatus for forming a plurality of superposed lines of dots corresponding to characters in a multiple level code, said apparatus comprising two elongated plates disposed edge-to-edge and slidable longitudinally, said plates each having embossed dots, selector means to move the plates independently back and forth to provide different combinations of superposed dots, means to move a tape in front of both plates in a direction longitudinally of the plates, a hammer having a long narrow hammer face disposed transversely of the direction of movement of the plates and movable toward and away from the slides and tape, said selector means including a first cable for moving one of said plates, said cable being trained reversely about one or more movable pulleys, a second cable for moving the other plate, said cable being trained reversely about one or more movable pulleys, and means for moving said pulleys to produce the desired combination of superposed dots.

34. A printer for printing a line of characters and for simultaneously forming a plurality of superposed lines of dots corresponding to said characters in a multiple level code, said apparatus comprising a type body, means for moving same in one direction, means for moving the same in a transverse direction, two elongated plates disposed edge-to-edge and slidable longitudinally, said plates each having embossed dots, selector means to move the plates independently back and forth to provide different combinations of superposed dots, means to move a tape in front of the type body and both plates in a direction longitudinally of the plates, and a hammer having a long narrow hammer face disposed transversely of the direction of movement of the plates and movable toward and away from the type body and plates and tape, the code dots produced by said plates corresponding to the character printed by said type cylinder.

35. A printer for printing a line of characters and for simultaneously forming a plurality of superposed lines of dots corresponding to said characters in a multiple level code, said apparatus comprising a type body, selector means for moving same in one direction, selector means for moving the same in a transverse direction, two elongated plates disposed edge-to-edge and slidable longitudinally, said plates each having embossed dots, selector means to move the plates independently back and forth to provide different combinations of superposed dots, means to move a tape in front of the type body and both plates in a direction longitudinally of the plates, a hammer having a long narrow hammer face disposed transversely of the direction of movement of the plates and movable toward and away from the type body and plates and tape, said selector means comprising a first cable for moving one of said plates, said cable being trained reversely about one or more movable pulleys, a second cable for moving the other plate, said cable being trained reversely about one or more movable pulleys, and means for moving said pulleys to produce the desired combination of superposed dots, said first cable serving also to move said type body in one direction, and said second cable serving also to move said type body in the other direction, the code dots produced by said plates corresponding to the character printed by said type cylinder.

36. A printer for printing a line of characters and for simultaneously forming a plurality of superposed lines of dots corresponding to said characters in a multiple level code, said apparatus comprising an elongated type body, means for moving the same, an elongated plate movable longitudinally and having embossed dots, means to move the plate to provide different combinations of superposed dots, means to move a tape in front of both the type body and the plate in a direction longitudinal of the body type and plate, and a hammer having a hammer face disposed transversely of the direction of movement of the tape and movable toward and away from the type body and plate, the code dots produced by said plate corresponding to the character printed by said type body.

37. Apparatus for the transmission of a telegraph message with minimum chance of error, said apparatus comprising means to print the message in conventional characters and simultaneously in code dots corresponding to the characters in a multiple-level code, support means to display a line of the conventional characters of the message in position for reading and detection of possible error, means movable along said displayed line of characters for operation at any desired point to mark the location of an error by a mark which may be machine read, means responsive to said mark and a code reader for reading the code dots to again print the message in conventional characters and code dots up to but not including the indicated error, whereby the corrected character and its code dots then may be printed manually and the regeneration of the signal by the reader then resumed and the corrected message being displayed for a second reading for accuracy, and means whereby the reader may be used for transmission of the corrected message over an outgoing line.

38. A display transmitter comprising a keyboard, a printer located at and responsive to said keyboard to print on a tape a line of characters and to simultaneously form a plurality of superposed lines of dots corresponding to said characters in a multiple level code, support means to support and to afford visible display of said line of characters for possible correction, a code reader for reading said dots, transmission means responsive to said reader, an indicator mounted for sliding movement along said tape and said line of characters to point to an error, means associated with and movable with said indicator to provide on said tape an additional error indicating dot which may be read by a reader, switch means whereby the reader may be used either for outgoing transmission or for regeneration of the printed message, means effective in response to an error indicating dot to stop the regenerative printing just ahead of the error, whereby the keyboard then may be used to print the correct character with its code dots, and the regenerative printing resumed until a correct message is displayed before actual transmission.

39. A display transmitter comprising a printer to print on a tape a line of characters and to simultaneously form a plurality of code symbols which may be machine read, a code reader for producing electrical pulses in response to said dots, said reader being spaced from said printer and helping to support said tape and to afford visible display of said line of characters between said printer and said reader for possible correction, an indicator slidably mounted for movement along said tape between said printer and said reader in order to permit the operator to point to a character which is to be corrected, and means associated with said indicator to add an additional error-indicating symbol which may be machine read, in order to assist subsequent correction of the error.

40. A display transmitter comprising a keyboard, a printer located at and responsive to said keyboard to print on a tape a line of characters and to simultaneously form a plurality of code symbols which may be machine read, a code reader for providing electrical pulses in response to said dots, said reader being spaced from said printer and helping support a desired length of said tape therebetween to afford visible display of said line of characters for possible correction, an indicator slidably mounted for movement along said tape between said printer and said reader in order to permit the operator to point to a character which is to be corrected, and means associated with and movable with said indicator to add to the tape an additional error-indicating symbol which may be machine read, in order to assist subsequent correction of the error.

41. A display transmitter comprising a printer to print on a tape a line of characters and to simultaneously form a plurality of superposed lines of dots corresponding to said characters in a multiple level code, a code reader for reading said dots, said reader being spaced from said printer and helping to support said tape and to afford visible display of said line of characters between said printer and said reader for possible correction, transmission means responsive to said reader, an indicator mounted for sliding movement along said line of characters to point to an error, means associated with said indicator to provide an additional error indicating dot which may be read by a reader, and regeneration and transmission means responsive to said reader.

42. A display transmitter comprising a keyboard, a printer located at and responsive to said keyboard to print on a tape a line of characters and to simultaneously form a plurality of superposed lines of dots corresponding to said characters in a multiple level code, a code reader for reading said dots, said reader being spaced from said printer and helping to support said tape and to afford visible display of said line of characters for possible correction, transmission means responsive to said reader, an indicator mounted for sliding movement along said tape and said line of characters to point to an error, means associated with and movable with said indicator to provide on said tape an additional error indicating dot which may be read by a reader, and regeneration and transmission means responsive to said reader.

References Cited in the file of this patent

UNITED STATES PATENTS

| | | |
|---|---|---|
| 1,772,186 | Lee | Aug. 5, 1930 |
| 2,382,251 | Parker | Aug. 14, 1945 |
| 2,727,944 | Howard | Dec. 20, 1955 |
| 2,811,235 | Geissler | Oct. 29, 1957 |
| 2,848,088 | Shaw | Aug. 19, 1958 |